US008473135B2

(12) United States Patent
Sekijima et al.

(10) Patent No.: US 8,473,135 B2
(45) Date of Patent: Jun. 25, 2013

(54) INFORMATION AND TELECOMMUNICATIONS SYSTEM, VEHICULAR DEVICE, CENTER DEVICE, AND METHOD FOR CONTROLLING THE SYSTEM

(75) Inventors: Erika Sekijima, Obu (JP); Satoru Noro, Nagoya (JP); Kiyohiko Sawada, Nagoya (JP); Teruhiko Fujita, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/367,547

(22) Filed: Feb. 7, 2012

(65) Prior Publication Data

US 2012/0203409 A1     Aug. 9, 2012

(30) Foreign Application Priority Data

Feb. 9, 2011 (JP) .................................. 2011-26035
Nov. 9, 2011 (JP) ................................. 2011-245434

(51) Int. Cl.
*G01C 21/36* (2006.01)
(52) U.S. Cl.
USPC ........................................... 701/22; 701/400
(58) Field of Classification Search
USPC .................... 701/22, 400; 320/109
See application file for complete search history.

(56) References Cited

U.S. PATENT DOCUMENTS

| 2008/0039989 A1* | 2/2008 | Pollack et al. ................... 701/22 |
| 2009/0254234 A1 | 10/2009 | Noguchi et al. |
| 2011/0196601 A1* | 8/2011 | Miura et al. ................... 701/200 |

FOREIGN PATENT DOCUMENTS

| JP | A-2001-112121 | 4/2001 |
| JP | 2005210843 A * | 8/2005 |
| JP | A-2005-210843 | 8/2005 |
| JP | A-2006-058085 | 3/2006 |
| JP | 2006115623 A * | 4/2006 |
| JP | A-2006-115623 | 4/2006 |
| JP | A-2007-252118 | 9/2007 |
| JP | A-2009-137340 | 6/2009 |
| JP | A-2010-52652 | 3/2010 |
| JP | A-2010-197211 | 9/2010 |

OTHER PUBLICATIONS

Nishikawa, Kenji, "Power Supplying System, Vehicle Power Supply and Roadside Power Supply,", Aug. 4, 2005, JP 2005210843 A JPO machine translation.*
Nishida, Shoji et al, "Travelable Distance Estimation System," Apr. 27, 2006, JP 2006115623 A, JPO machne translation.*
Office Action mailed Mar. 26, 2013 in corresponding JP Application No. 2011-245434 (and English translation).

* cited by examiner

*Primary Examiner* — James P Trammell
*Assistant Examiner* — Yuen Wong
(74) *Attorney, Agent, or Firm* — Posz Law Group, PLC

(57) ABSTRACT

A vehicle-side storage unit of a vehicular device associates and stores an already-traveled route and power consumption when a self vehicle has traveled the already-traveled route, as traveling history data. A vehicle-side control unit of the vehicular device transmits the traveling history data to a center device. A center-side storage unit of the center device stores the traveling history data transmitted from multiple vehicles. A center-side control unit of the center device calculates a necessary electric power for traveling a first route in a guide route, based on the traveling history data of an other vehicle stored in the center-side storage unit, the first route being not overlapping with the already-traveled route of the self vehicle stored in the center-side storage unit.

28 Claims, 21 Drawing Sheets

FIG. 3A

| VEHICLE ID | VEHICLE MODEL NAME | TYPE | MODEL YEAR |
|---|---|---|---|
| X | aaa | p | H20 |
| B | bbb | q | H21 |
| C | ccc | r | H15 |
| D | aaa | p | H18 |
| ... | ... | ... | ... |

FIG. 3B

| ALREADY-TRAVELED ROUTE (LINK, NODE) | ELECTRIC POWER CONSUMPTION, TRAVELING TIME OF DAY | | | | | | | | |
|---|---|---|---|---|---|---|---|---|---|
| | VEHICLE ID=X | | VEHICLE ID=B | | VEHICLE ID=C | | VEHICLE ID=D | | ... |
| l1 | 10 | 8:30 | 12 | 12:15 | 12 | 16:00 | 9 | 20:29 | ... |
| | | | | | | | 10 | 7:29 | |
| l2 | 10 | 8:31 | 12 | 12:16 | 12 | 16:01 | 9 | 20:30 | ... |
| | | | | | | | 10 | 7:30 | |
| l3 | — | — | 13 | 12:17 | 12 | 16:02 | 9 | 20:31 | ... |
| | | | | | | | 10 | 7:31 | |
| l4 | — | — | 14 | 12:18 | 12 | 16:03 | 9 | 20:32 | ... |
| | | | | | | | 10 | 7:32 | |
| ... | ... | | ... | | ... | | ... | | ... |

FIG. 4

| VEHICLE ID | DRIVING CHARACTERISTICS ||||| ELECTRIC POWER CONSUMPTION CHARACTERISTICS |
| --- | --- | --- | --- | --- | --- |
| | ACCELERATOR | BRAKE | ACCELERATION | GYROSCOPE | |
| X | RAPID | RAPID | LARGE | LARGE | 1.5 (LARGE) |
| B | MIDDLE | MIDDLE | MIDDLE | MIDDLE | 1.0 (MIDDLE) |
| C | GENTLE | GENTLE | GENTLE | GENTLE | 0.8 (SMALL) |
| D | RAPID | MIDDLE | LARGE | LARGE | 1.4 (LARGE) |
| ... | ... | ... | ... | ... | ... |

FIG. 5

| VEHICLE ID | CURRENT POSITION (DEPARTURE POINT) | DESTINATION | ELECTRICITY STORAGE QUANTITY | NECESSARY ELECTRIC POWER | EXCESS/DEFICIT OF ELECTRIC POWER | GUIDE ROUTE INFORMATION (LINK, NODE) | DEPARTURE TIME OF DAY | ARRIVAL TIME OF DAY |
| --- | --- | --- | --- | --- | --- | --- | --- | --- |
| X | POINT U | POINT V | 50 | 80 | -30 | 100, 101, ... | 2010/08/30 8:00 | 2010/08/30 12:00 |
| B | POINT M | POINT N | 60 | ... | ... | 200, 201, ... | CURRENT TIME OF DAY | 2010/08/30 20:00 |
| C | POINT M | POINT V | 25 | ... | ... | 200, 201, ... | 2010/08/30 10:00 | 2010/08/30 12:00 |
| D | POINT Y | POINT U | 10 | ... | ... | 300, 301, ... | 2010/08/31 16:00 | 2010/08/31 19:00 |
| ... | ... | ... | ... | ... | ... | ... | ... | ... |

FIG. 12

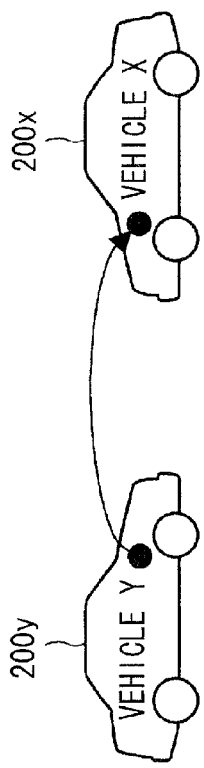

| OPTIONS FOR DETERMINING ELECTRIC POWER TRANSMISSION QUANTITY | CONTENTS |
|---|---|
| ELECTRIC POWER TRANSMISSION TIME | ELECTRIC POWER TRANSMISSION TIME SET UP, AND TRANSMITTABLE ELECTRIC POWER IN TIME |
| DISTANCE THAT VEHICLE X CAN TRAVEL | ELECTRIC POWER REQUIRED FOR DISTANCE VEHICLE X WANTS TO TRAVEL, OUT OF SURPLUS ELECTRIC POWER OF VEHICLE Y |
| DEGREE OF MARGIN OF RESIDUAL QUANTITY OF VEHICLE Y AFTER ELECTRIC POWER SUPPLY | DEGREE OF MARGIN OF BATTERY CHARGE QUANTITY OF VEHICLE Y AFTER ELECTRIC POWER TRANSMISSION<br>(EXAMPLE)<br>LARGE: FULL MARGIN LEFT TO SURPLUS ELECTRIC POWER<br>MIDDLE: MODERATE DEGREE OF MARGIN<br>SMALL: SMALL DEGREE OF MARGIN |
| MODE | ELECTRIC POWER TRANSMISSION OPTION NOT REQUIRING MINUTE SETUP<br>(EXAMPLE)<br>QUICK: ELECTRIC POWER ALLOWING VEHICLE X TO TRAVEL ABOUT 5KM<br>NORMAL: ELECTRIC POWER ALLOWING VEHICLE X TO TRAVEL ABOUT 10KM |

INFORMATION AND TELECOMMUNICATIONS SYSTEM, VEHICULAR DEVICE, CENTER DEVICE, AND METHOD FOR CONTROLLING THE SYSTEM

CROSS REFERENCE TO RELATED APPLICATIONS

This application is based on Japanese Patent Applications No. 2011-26035 filed on Feb. 9, 2011 and No. 2011-245434 filed on Nov. 9, 2011, the contents of which are incorporated in their entirely herein by reference.

TECHNICAL FIELD

The present invention relates to an information and telecommunications system, a vehicular device, and a center device, for calculating a necessary electric power quantity for traveling to a destination. The present invention relates to a method for controlling the information and telecommunications system.

BACKGROUND

In order to utilize the electric power energy of a vehicle efficiently, an electric power supply system has been proposed, in which, when the electric power of a self vehicle is short, the electric power is received from the exterior of the vehicle, and when the electric power of a self vehicle has a surplus, the electric power is transmitted to the exterior of the vehicle. According to the description of JPA-2005-210843, when a surplus occurs in the remaining capacity of a battery as a result of collecting regeneration energies, for example, surplus electric power is transmitted from a vehicular power supply device to the exterior of the vehicle. Accordingly, the collected regeneration energy and the like are effectively utilized.

When the surplus electric power is transmitted to the exterior of the vehicle in this way, it suffices to determine a quantity of electric power transmission so that the self vehicle may not fall in electric power deficiency. In particular, in cases where the destination is set up, it is desirable to preserve a necessary electric power quantity to reach at least there and to transmit the remaining quantity to the exterior of the vehicle as surplus electric power.

However, the vehicular power supply device described in JP-A-2005-210843 is configured such that the quantity of collected regeneration energy is treated as surplus electric power, and no consideration is taken for a necessary electric power quantity for traveling to a destination. In this regard, it is possible to calculate the necessary electric power quantity for traveling to the destination, for example, using the mean electric power consumption of the self vehicle. However, it is difficult to expect sufficient accuracy in the calculation. Even if electric power consumption has been recorded in conjunction with the route traveled by the self vehicle, it is difficult to calculate a necessary electric power quantity with sufficient accuracy, in the case of traveling a new route which had not been traveled in the past.

SUMMARY

It is an object of the present invention to produce an information and telecommunications system, a vehicular device, and a center device, in which a necessary electric power quantity can be calculated accurately, even in the case of traveling a route which a self vehicle had not traveled in the past. It is another object of the present invention to produce a method for controlling the information and telecommunications system.

According to an aspect of the present invention, an information and telecommunications system comprises a vehicular device. The vehicular device includes a vehicle-side communication unit. The vehicular device further includes a vehicle-side storage unit configured to associate an already-traveled route with a power consumption when a self vehicle has traveled the already-traveled route and store the associated already-traveled route and the power consumption, as traveling history data. The vehicular device further includes a vehicle-side control unit configured to transmit the traveling history data. The information and telecommunications system further comprises a center device. The center device includes a center-side communication unit configured to implement communications with the vehicle-side communication unit. The center device further includes a center-side storage unit configured to store the traveling history data transmitted from a plurality of vehicles each equipped with the vehicular device. The center device further includes a center-side control unit configured to calculate a necessary electric power quantity for traveling a first route, which is not overlapping with the already-traveled route of the self vehicle stored in the center-side storage unit, based on the traveling history data of an other vehicle stored in the center-side storage unit, the first route being included in a guide route, which is to be traveled by the self vehicle.

According to another aspect of the present invention, a center device comprises a center-side receiving unit configured to receive, from a plurality of vehicles, traveling history data including an already-traveled route, which is traveled by a vehicle, associated with power consumption when the vehicle has traveled the already-traveled route. The center device further comprises a center-side storage unit configured to store the traveling history data received by using the center-side receiving unit. The center device further comprises a center-side control unit configured to calculate a necessary electric power quantity for traveling all or a part of a guide route, which a predetermined vehicle travels. The center-side control unit is further configured to calculate the necessary electric power quantity of the predetermined vehicle, based on the traveling history data of vehicles other than the predetermined vehicle, stored in the center-side storage unit.

According to another aspect of the present invention, a method for controlling an information and telecommunications system including a vehicular device and a center device respectively equipped with communication units for communicating with each other, the method comprises causing a vehicle-side storage unit of the vehicular device to associate an already-traveled route with a power consumption when a self vehicle has traveled the already-traveled route and to store the associated already-traveled route and the power consumption, as traveling history data. The method further comprises causing a vehicle-side control unit of the vehicular device to transmit the traveling history data. The method further comprises causing a center-side storage unit of the center device to store the traveling history data transmitted from a plurality of vehicles each equipped with the vehicular device. The method further comprises causing a center-side control unit of the center device to calculate a necessary electric power quantity for traveling a first route, which is not overlapping with the already-traveled route of the self vehicle stored in the center-side storage unit, based on the traveling history data of an other vehicle stored in the center-side storage unit, the first route being included in a guide route, which is to be traveled by the self vehicle.

BRIEF DESCRIPTION OF THE DRAWINGS

The above and other objects, features and advantages of the present disclosure will become more apparent from the following detailed description made with reference to the accompanying drawings. In the drawings:

FIG. 3A and FIG. 3B are drawings illustrating an example of vehicle type information and traveling history data which are stored in a memory device of the center device;

FIG. 4 is a drawing illustrating an example of driving characteristics and electric power consumption characteristics which are stored in the memory device of the center device;

FIG. 5 is a drawing illustrating an example of a current position, a destination, and so on which are stored in the memory device of the center device;

FIG. 12 is a drawing illustrating an example of options and contents, which can be specified in the case of electric power transmission;

DETAILED DESCRIPTION (First Embodiment)

Figure 1:
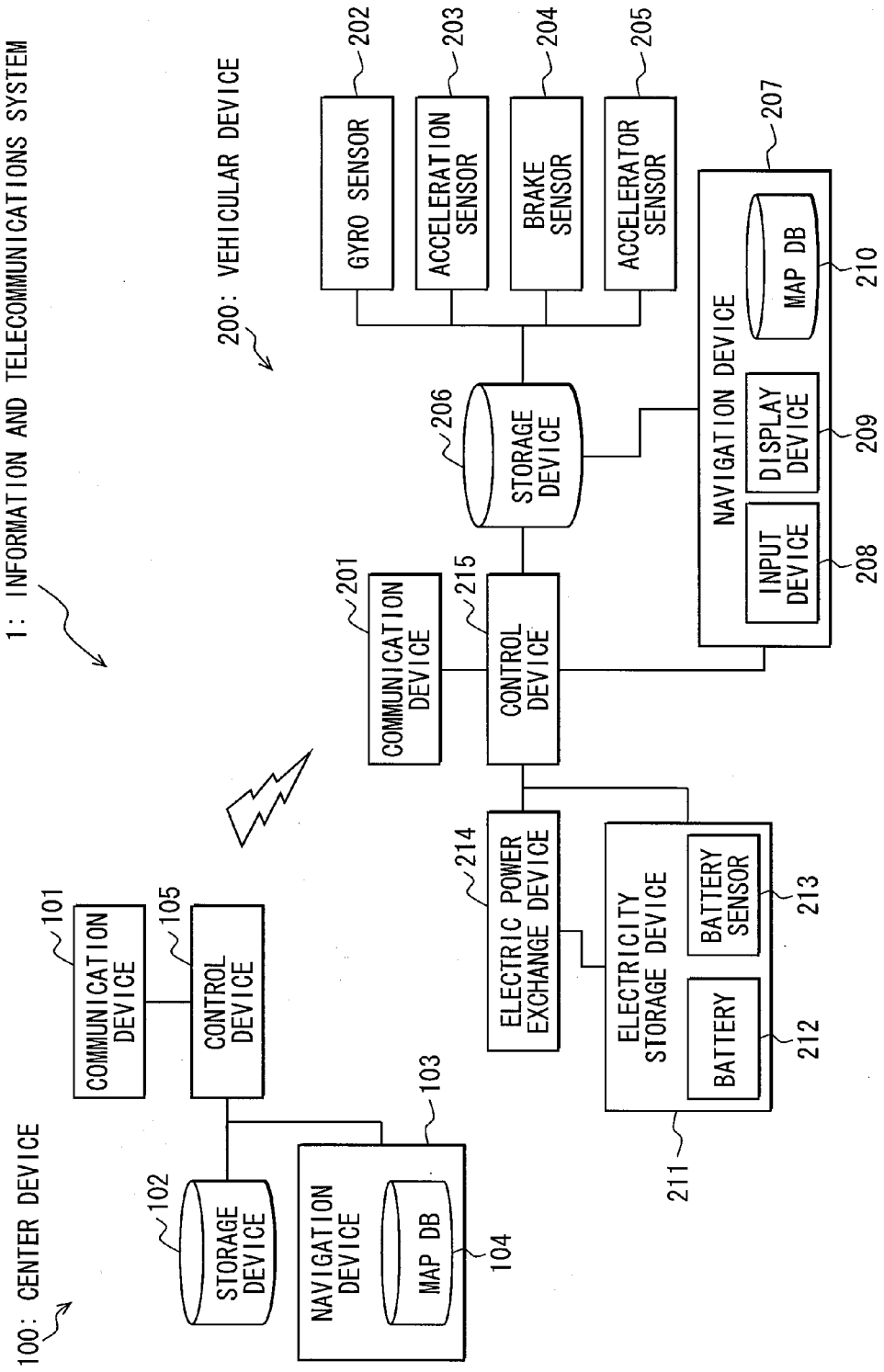
FIG. 1 is a schematic diagram illustrating an entire configuration of an information and telecommunications system in First Embodiment.

The configuration of an information and telecommunications system according to First Embodiment is explained with reference to FIG. 1. FIG. 1 is a schematic diagram illustrating an entire configuration of the information and telecommunications system 1 configured with a center device 100 and a vehicular device 200.

The center device 100 includes a communication device 101, a storage device 102, a navigation device 103, and a control device 105. The communication device 101 communicates by radio with the vehicular device 200 mounted in each vehicle.

The storage device 102 stores various data received by the communication device 101, including information on a departure point and a destination, transmitted from the vehicular device 200, a guide route searched by the control device 105 based on the departure point and the destination which have been transmitted from each vehicular device 200, information on a route searched by the navigation device 103, and the others. The storage device 102 may correspond to the center-side storage unit. The storage device 102 may be configured with a volatile RAM or the like, but it may be configured with a nonvolatile HDD. The navigation device 103 includes a map DB 104 which stores information related to links and nodes to form a map, and implements route search from a departure point to a destination. The navigation device 103 may correspond to the center-side route searching unit.

The control device 105 is a computer for controlling the entire of the center device 100, and typically implements calculation of a necessary electric power quantity to be described later, with reference to the various data stored in the storage device 102. The control device 105 includes (not shown) a CPU, an ROM as a storage medium storing a program and others for producing each function, an RAM for storing data temporarily as a work area, and a bus for coupling the above components. Each function is produced when the CPU executes the program stored in the ROM. The control device 105 may correspond to the center-side control unit.

The vehicular device 200 includes a communication device 201, a gyro sensor 202, an acceleration sensor 203, a brake pedal sensor 204, an accelerator pedal sensor 205, a storage device 206, a navigation device 207, an electricity storage device 211, an electric power transmission/reception device (electric power exchange device) 214, and a control device 215. The communication device 201 communicates with the center device 100 in the exterior of the vehicle by radio. The gyro sensor 202, the acceleration sensor 203, the brake pedal sensor 204, and the accelerator pedal sensor 205 detect respectively an angular velocity, acceleration in the anteroposterior direction, an operation quantity of a brake pedal, and an operation quantity of an accelerator, each of a self vehicle. These sensors 202-205 are employed in order to detect driver's driving characteristics, and they may correspond to the driving characteristics data detection unit. In addition, it is also conceivable to provide a steering sensor for detecting a steering angle, and a lateral acceleration sensor for detecting lateral acceleration.

The storage device 206 includes a volatile RAM or a nonvolatile HDD and stores, for example, output values of each of the sensors 202-205, a traveling route and electric power consumption in traveling the route, obtained from the navigation device 207. The storage device 206 may correspond to the vehicle-side storage unit. The navigation device 207 includes an input device 208, a display 209, and a map DB 210. The navigation device 207 calculates the current position of a self vehicle from a signal received from the GPS satellites by a GPS receiver (not shown), and implements route search from the current position to the destination. The input device 208 is a touch panel, for example, through which a user inputs a destination and others. The display 209 is a liquid crystal display, for example, and displays a map and a guide route searched. Here, the navigation device 207 may correspond to the vehicle-side route searching unit, the input device 208 may correspond to the input unit, and the display 209 may correspond to the informing unit.

The electricity storage device 211 includes a battery 212 and a battery sensor 213, and possesses the function of charging electrical energy collected by a regeneration brake (not shown) into the battery 212. The battery sensor 213 detects an electricity storage quantity of the battery 212 from a voltage between terminals of the battery 212, for example. The battery sensor 213 may correspond to the electricity storage quantity detection unit. The electric power transmission/reception device 214 implements electric power transmission or electric power reception by electromagnetic waves via an antenna (not shown), for example, as described in JP-A-2005-210843. In receiving electric power, a current is generated, through an electromagnetic induction action, in response to the change of a magnetic field of the electromagnetic waves received from the antenna, and the current generated is rectified and stored in the battery 212. In transmitting electric power, electromagnetic waves are radiated from the antenna using the electric power of the battery 212. The electric power transmission/reception device 214 may employ wireless transmission in this way, or wired transmission using a plug. The electric power transmission/reception device 214 may correspond to the electric power transmission unit.

The control device 215 is a computer which controls the entire of the vehicular device 200, such as control of electric power transmission or reception by the electric power transmission/reception device 214, and control of signal transmission or reception by the communication device 201. The control device 215 includes (not shown) a CPU, an ROM as a storage medium storing a program and others for producing each function, an RAM for storing data temporarily as a work area, and a bus for coupling the above components. The CPU executes the program stored in the ROM to produce functions, such as control of transmission/reception (exchange) of data, calculation of electric power consumption, and record control of the storage device 206. The control device 215 may correspond to the vehicle-side control unit.

Figure 2:
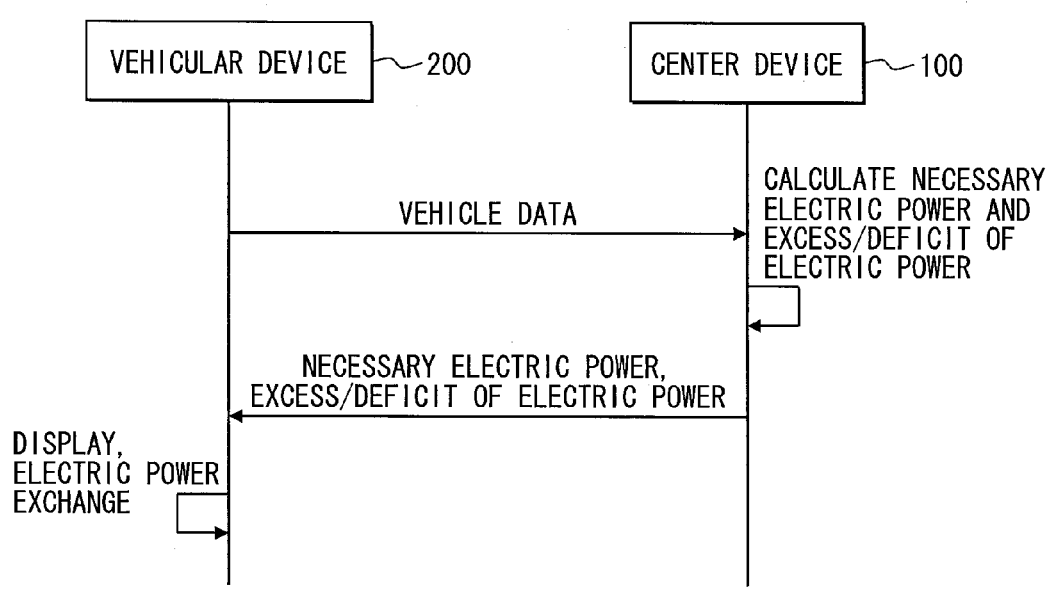
FIG. 2 is a sequence diagram illustrating an outline of the communications processing in a vehicular device and a center device.

Next, an outline of the communications processing in the vehicular device 200 and the center device 100 are explained with reference to FIG. 2. FIG. 2 is a sequence diagram illustrating the outline of the communications processing. First, the control device 215 of the vehicular device 200 transmits the vehicle data related to a vehicle, such as a departure point and a destination, to the center device 100, and requests calculation of a necessary electric power quantity and an excess/deficit of electric power quantity for traveling to the destination. Next, the control device 105 of the center device 100 implements the calculation of the necessary electric power quantity and the excess/deficit of electric power quantity for traveling to the destination, based on the received vehicle data, and transmits the calculation results of the necessary electric power quantity and the excess/deficit of electric power quantity to the vehicular device 200. The vehicular device 200 receives the necessary electric power quantity and the excess/deficit of electric power quantity and displays them on the display 209. By use of the electric power transmission/reception device 214, the vehicular device 200 implements electric power transmitting to the exterior of the vehicle in the case of an excessive electric power quantity, and implements electric power receiving from the exterior of the vehicle in the case of a deficit of electric power quantity. The following explains each processing in the vehicular device 200 and the center device 100.

First, storage processing and transmission processing of electric power consumption in the vehicular device 200 are explained with reference to FIG. 3A and FIG. 3B. The control device 215 obtains periodically a current position and route information (a link and a node) for the current position, from the navigation device 207. When the obtained current position is a start point and an end point of the link, the electricity storage quantity of the battery 212 is obtained from the electricity storage device 211, and a quantity of variation of the electricity storage quantity at the start point and the end point of the link is calculated as electric power consumption. The information of a route traveled (already-traveled route information), the calculated electric power consumption, and the traveling time of day when traveling the route are associated with each other and stored in the storage device 206 as traveling history data.

The traveling history data is transmitted from the communication device 201 to the center device 100, with a vehicle ID (for example, registration number) for identifying the vehicle. Here, it is also conceivable to transmit vehicle type information such as a manufacture name, a vehicle model name, a type, and a model year, as information related to the vehicle type, in addition to the vehicle ID. The vehicle data such as the traveling history data and the vehicle type information may be transmitted at predetermined time intervals while the ignition is on, or the vehicle data stored may be transmitted by package when the ignition is turned off. The traveling history data and the vehicle type information may be transmitted concurrently or separately.

On the other hand, the communication device 101 of the center device 100 receives the vehicle data transmitted from each vehicle which is equipped with the vehicular device 200. The control device 105 stores the traveling history data and the vehicle identification information together with the vehicle ID, in the storage device 102. FIG. 3A and FIG. 3B illustrate an example of the data stored in the storage device 102 of the center device 100. In FIG. 3A, the vehicle identification information such as a vehicle model name, a type, and a model year are stored for every vehicle ID. In FIG. 3B, the electric power consumption and the traveling time of day are stored for every already-traveled route (11, 12, 13, 14, and so on) and every vehicle ID (X, B, C, D, and so on). As in a vehicle D (vehicle ID=D), when the same route has been traveled at a different traveling time of day, the electric power consumption in each traveling time of day is stored. For example, as the data of the vehicle D to a route 12, the electric power consumption in traveling at 20:30 and the electric power consumption in traveling at 7:30 are stored. The vehicle data stored in the storage device 102 is utilized in the arithmetic processing of a necessary electric power quantity to be described later.

With reference to FIG. 4, the following explains the storage processing and transmission processing of each sensor output value in the vehicular device 200, and the decision processing of the driving characteristics and electric power consumption characteristics in the center device 100. The control device 215 of the vehicular device 200 obtains the output values of the sensors 202-205, stores them sequentially in the storage device 206, and transmits these output values as the vehicle data together with the vehicle ID, from the communication device 201 to the center device 100. The vehicle data may be periodically transmitted at predetermined time intervals while the ignition is on, or the data for a predetermined time period may be transmitted by package before the ignition is turned off.

On the other hand, the communication device 101 of the center device 100 receives the vehicle data transmitted from the vehicular device 200. The control device 105 stores each sensor output value received in the storage device 102 for every vehicle ID. The control device 105 calculates the driving characteristics and the electric power consumption characteristics of the vehicle concerned from each sensor output value, as follows. The control device 105 determines relative driving characteristics first from each sensor output value received. In the case of an accelerator operation quantity, the relative driving characteristics may be determined in terms of a mean value of the quantity of variation of the accelerator operation in a predetermined time, or in terms of the number of times that the quantity of variation of the accelerator operation in a predetermined time has exceeded a prescribed threshold value. The cases of a brake pedal operation and a gyroscope are similarly determined. On the other hand, in the case of acceleration, the relative driving characteristics are determined in terms of the mean value of the acceleration or the number of times that the acceleration has exceeded a prescribed threshold value.

As the relative driving characteristics, the relative driving characteristics for all the vehicles may be calculated, or the relative driving characteristics for the same or similar vehicle type may be calculated, with respect to a vehicle model name, a type, a model year, an engine displacement, etc. For example, the mean value of the acceleration in the same vehicle type is calculated, and relative driving characteristics are determined from a ratio to the mean value.

FIG. 4 is a conceptual diagram illustrating an example of the driving characteristics and the electric power consumption characteristics, stored in the storage device 102 of the center device 100. Data indicating the driving characteristics, such as an accelerator operation, a brake operation, acceleration, and angular velocity, and the electric power consumption characteristics are stored for every vehicle ID. FIG. 4 illustrates the relative driving characteristics in the same vehicle type, such that, for example, for a vehicle X (vehicle ID=X), the property of the accelerator operation quantity is "rapid", the property of the brake pedal operation quantity is "rapid", the property of the acceleration is "large", and the property of the gyroscope is "large." Here, as each of the driving characteristics, a ratio to the mean value may be stored as a driving characteristics coefficient.

Next, electric power consumption characteristics are determined based on each of the driving characteristics. The electric power consumption characteristics become high as each of the driving characteristics is "rapid" or "large", and the electric power consumption characteristics become small as each of the driving characteristics is "gentle." The electric power consumption characteristics may be expressed in terms of three levels of "large", "middle", and "small", or may be expressed in terms of a consumption characteristics coefficient calculated from each driving characteristics coefficient. For example, the mean value of each driving characteristics coefficient may be regarded as the consumption characteristics coefficient, or the weighted summation may be regarded as the consumption characteristics coefficient. In FIG. 4, since the vehicle X exhibits each of the driving characteristics as "rapid" or "large", the electric power consumption characteristics are also "large" (the consumption characteristics coefficient is 1.5).

With reference to FIG. 5, the following explains the transmission processing of the current position (departure point) and the destination in the vehicular device 200. Referring to the map DB 210, the navigation device 207 searches for the guide route from the current position to the destination which the user has set up, and calculates an expected arrival time of day to the destination. An "electric power quantity calculation button" is displayed on the display 209, together with the guide route to the destination and the expected arrival time of day. Here, by use of the input device 208, the user may specify a departure point which is different from the current position, or may specify a desired departure time of day and a desired arrival time of day. When a desired departure time of day is specified, the navigation device 207 calculates an expected arrival time of day on the basis of the desired departure time of day. On the other hand, when a desired arrival time of day is specified, an expected departure time of day is calculated back from the desired arrival time of day. When neither is specified, an expected arrival time of day is calculated on the basis of the current time of day.

Next, when the user selects the "electric power quantity calculation button" displayed on the display 209, the control device 215 implements the transmission processing of the vehicle data hereinafter. The control device 215 obtains the current position (departure point) and the destination from the navigation device 207. At this time, the control device 215 may obtain additionally schedule information, such as the expected arrival time of day to the destination calculated by the navigation device 207, or the desired departure time of day and the desired arrival time of day which have been specified by the user. The control device 215 obtains the electricity storage quantity of the battery 212 from the electricity storage device 211.

Subsequently, together with the vehicle ID for identifying a vehicle, the current position (departure point), the destination, the schedule information, and the battery charge quantity are transmitted as the vehicle data, from the communication device 201 to the center device 100. These processing may be automatically implemented, when a destination is set to the navigation device 207. The battery charge quantity may be transmitted concurrently with the information on the destination and others, or may be transmitted separately. For example, the system may be configured such that the battery charge quantity is transmitted when the center device 100 inquires about the battery charge quantity.

On the other hand, the communication device 101 of the center device 100 receives the vehicle data transmitted from the vehicular device 200. The control device 105 records the current position (departure point), the destination, the schedule information, and the battery charge quantity which have been received, in the storage device 102 for every vehicle ID. Subsequently, the navigation device 103 of the center device 100 searches for a guide route from the current position to the destination which have been received, and stores the guide route in the storage device 102. FIG. 5 is a conceptual drawing illustrating an example of the current position, the destination, the guide route information, and the schedule information which are to be stored in the storage device 102. Information including a current position, a destination, a battery charge quantity, guide route information, a departure time of day, an arrival time of day, etc., is stored for every vehicle ID. Here, as in the vehicle B (vehicle ID=B) illustrated in FIG. 5, when the departure time of day is not received as the schedule information, the current time of day is stored as the alternative. In the above explanation, the center device 100 is configured so as to search for a guide route. However, it is also conceivable to employ a configuration in which the control device 215 of the vehicular device 200 transmits guide route information including a link and a node in addition to a current position and a destination.

Figure 6:
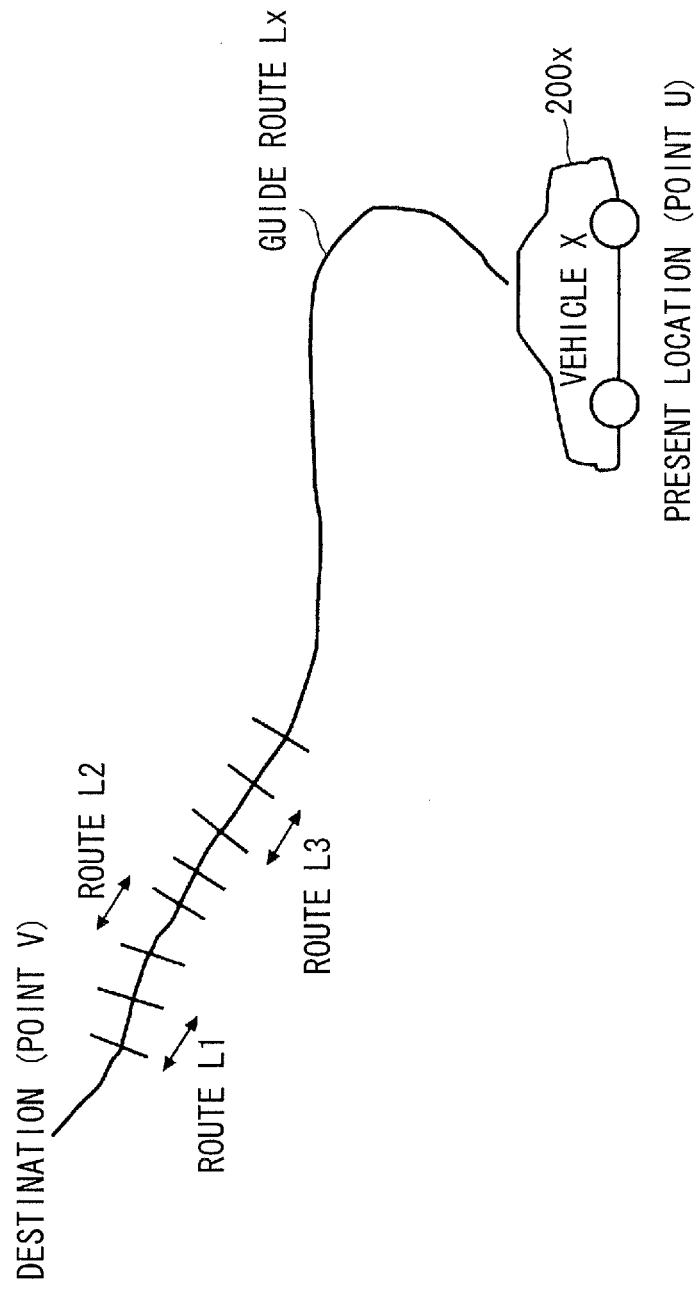
FIG. 6 is a drawing illustrating a guide route from a current position of a vehicle to a destination.
Figure 7:
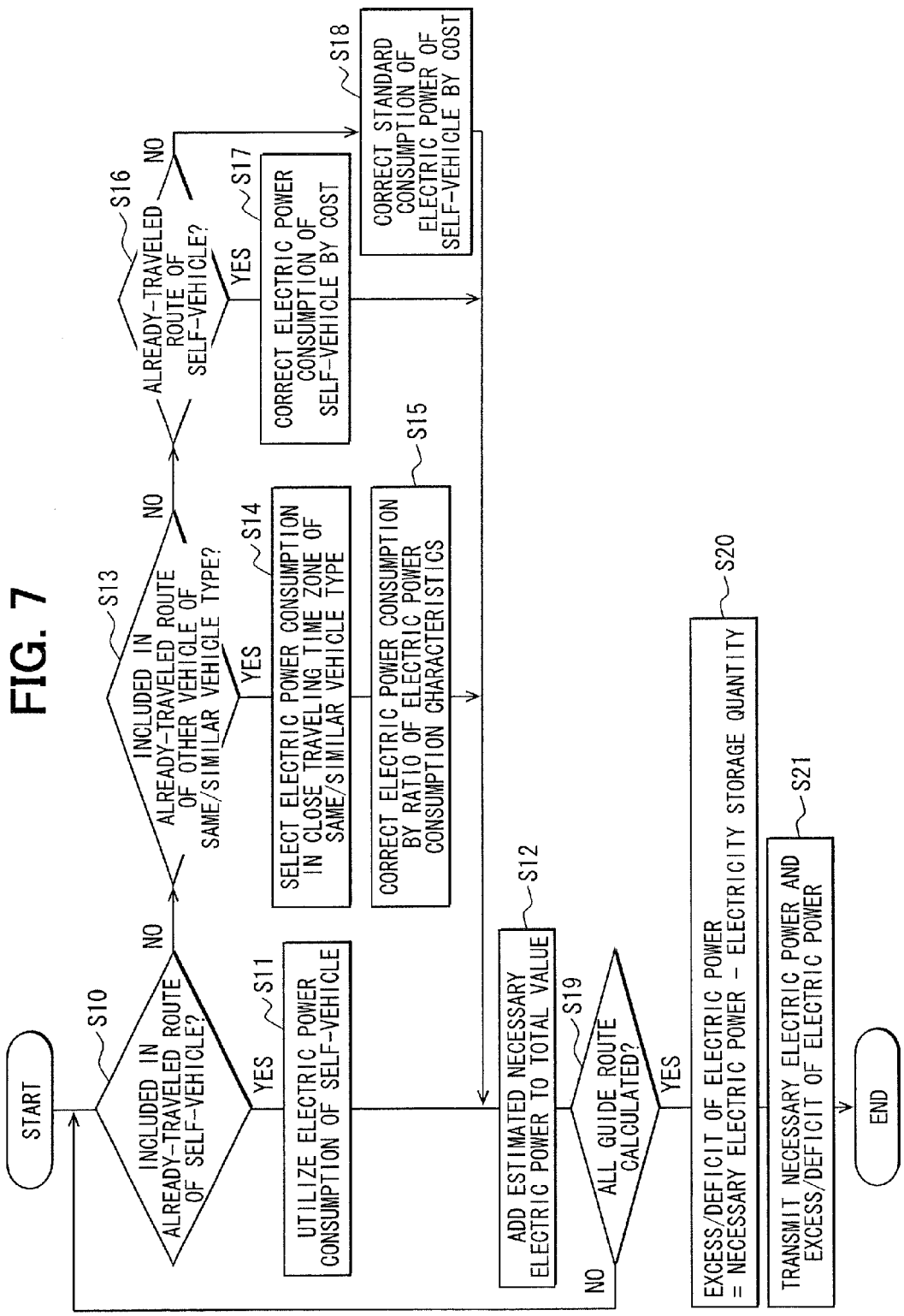
FIG. 7 is a flow chart illustrating arithmetic processing of a necessary electric power quantity and an excess/deficit of electric power quantity.
Figure 8:
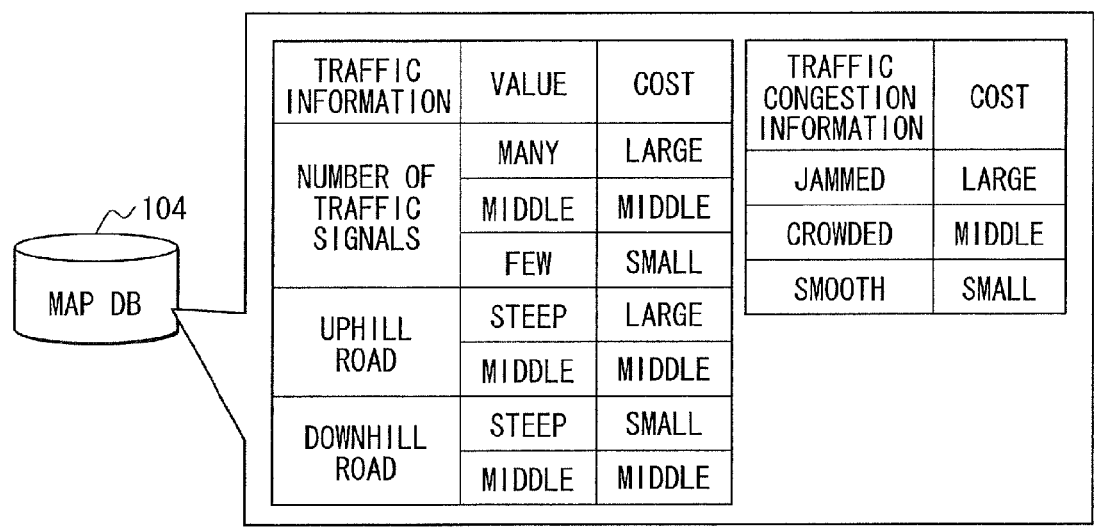
FIG. 8 is a drawing illustrating an example of the calculation result of an electric power consumption cost.

Next, the arithmetic processing of a necessary electric power quantity and an excess/deficit of electric power quantity in the center device 100 is explained, with reference to FIG. 6 through FIG. 8. FIG. 6 illustrates a guide route Lx from a current position (point U) of a vehicle X to a destination (point V). FIG. 7 is a flow chart illustrating the arithmetic processing of a necessary electric power quantity and an excess/deficit of electric power quantity in the control device 105. FIG. 8 illustrates the calculation result of the electric power consumption cost in the center device 100. Hereinafter, the explanation will be made along with the flow chart illustrated in FIG. 7. In each determination processing of the flow chart, the case of "yes" is expressed as "Step S10: Y", for example, and the case of "no" is expressed as "Step S10: N", for example.

First, at Step S10, it is determined whether the already-traveled route of a vehicle X illustrated in FIG. 3B is included in the guide route Lx of the vehicle X. When the route L1 illustrated in FIG. 6 is included in the already-traveled route of the vehicle X (Step S10: Y), the electric power consumption at the time of the vehicle X traveling the route L1 is used for calculation of the necessary electric power quantity to the route L1 (Step S11). Subsequently, at Step S12, the present electric power consumption is added to the total value of the necessary electric power quantity.

Next, the case where the route L2 illustrated in FIG. 6 is not included in the already-traveled route of the vehicle X (Step S10: N) is explained. In this case, the flow advances to Step S13 and an already-traveled route of other vehicles other than the vehicle X illustrated in FIG. 3B is referred to, and the other vehicle of which the already-traveled route includes the route L2 is searched for. Referring to the vehicle type information illustrated in FIG. 3A, the other vehicle of an identical or similar vehicle type as the vehicle X is searched for, among other vehicles of which the already-traveled route includes the route L2. Being the same vehicle type may be determined in terms of the same vehicle model name, or it may be determined in terms of the same vehicle model name and type and the same model year. For example, in the example of FIG. 3A, the vehicle D (vehicle ID=D) is the same vehicle type as the vehicle X. On the other hand, being the similar vehicle type may be determined in terms of a group of vehicle model names which are determined in advance, or it may be determined in terms of the same type of a power system, irrespective of the vehicle model name. When the same vehicle type has been searched for, it is not necessary to search for a similar vehicle type.

Subsequently, the necessary electric power quantity to the route L2 is calculated, by employing the electric power consumption obtained when the vehicle D, which has been searched for in this way and determined to be the same vehicle type as the vehicle X, has traveled the route L2. First, at Step S14, when multiple pieces of data of a traveling time of day and electric power consumption are stored to the same route, as illustrated in FIG. 3B, one piece of data of the electric power consumption is selected, based on the departure time of day and/or the arrival time of day of the vehicle X. Specifically, compared with the time zone from the departure time of day to the arrival time of day of the vehicle X, the electric power consumption of the vehicle D in the traveling time of day of a closer time zone is selected. When the route L2 is assumed to be the already-traveled route 13 illustrated in FIG. 3B, what is selected is the electric power consumption of the vehicle D at the traveling time of day 7:31, which is close to the time zone from the departure time of day (8:00) to the arrival time of day (12:00) of the vehicle X illustrated in FIG. 5. When the electric power consumption at a different traveling time of day is not stored, it is sufficient to use the only one electric power consumption.

Subsequently, at Step S15, when there is a difference between the electric power consumption characteristics of the vehicle X and the electric power consumption characteristics of the vehicle D, the electric power consumption of the vehicle D is corrected by the ratio of consumption characteristics coefficients to calculate the necessary electric power quantity to the route L2. According to the example of FIG. 4, the correction by the multiplication of a ratio 1.5/1.4 is implemented to the electric power consumption to the route L2 of the vehicle D. Subsequently, at Step S12, the electric power consumption after the correction is added to the total value of the necessary electric power quantity. When there exist multiple other vehicles which are the same vehicle type as the vehicle X and of which the already-traveled route includes the route L2, what is necessary is just to calculate the necessary electric power quantity to the route L2, by employing the electric power consumption of the other vehicle which has closer electric power consumption characteristics to the electric power consumption characteristics of the vehicle X.

Next, the following explains the case where the route L3 illustrated in FIG. 6 is not included in the already-traveled route of the vehicle X (Step S10: N), and the route L3 is not included in the already-traveled route of the other vehicle which is an identical or similar vehicle type (Step S13: N). In the present case, the flow advances to Step S16 and it is determined whether the information on the already-traveled route to the vehicle X is stored in the storage device 102. When it is determined that the information concerned is stored (Step S16: Y), the necessary electric power quantity to the route L3 is estimated at Step S17 as follows, using the electric power consumption to the already-traveled route of the vehicle X, that is, the electric power consumption at the time of traveling an arbitrary route.

In the map DB 104 of the center device 100, infrastructure information such as a signal and a crossing, regulation information such as a stop and a limiting speed, and road geometry information such as the gradient of a road and the curvature of a curve are stored in an associated manner with a position. The past tendency and the present state of traffic congestion of each road are also stored through reception of VICS information (registered trademark), probe information, or the like. The control device 105 uses these kinds of data related to the traveling environment stored in the map DB 104 to estimate the necessary electric power quantity to the route L3.

First, the control device 105 calculates the mean electric power consumption per unit distance from the electric power consumption to the already-traveled route of the vehicle X. The already-traveled route to be used for the present calculation is arbitrary; however, the mean electric power consumption to all already-traveled route is calculated here. Subsequently, the cost of the route L3 is calculated with reference to the traveling environment data stored in the map DB 104. FIG. 8 illustrates an example of calculation of the electric power consumption cost. As the traffic information, when the number of signals in the route L3 is greater than a predetermined reference value, the cost is determined as "large", when the number is comparable to the predetermined reference value, the cost is determined as "middle", and when the number is smaller than the predetermined reference value, the cost is determined as "small." When there are many signals, a possibility that a vehicle will stop will also become high. Therefore, it is estimated that the electric power consumption cost is great. Similarly, the electric power consumption cost may be determined corresponding to the number of stops.

As another traffic information, when an upward slope of the route L3 is steep (for example, the gradient equal to or greater than 5%), it is determined that the cost is "large", and when the upward slope is middle (for example, the gradient less than 5%), it is determined that the cost is "middle." On the other hand, when an downward slope of the route L3 is steep (for example, the gradient equal to or greater than 5%), it is determined that the cost is "small", and when the downward slope is middle (for example, the gradient less than 5%), it is determined that the cost is "middle." On a downhill road, collection of regeneration energy is expected; therefore, it is estimated that the electric power consumption cost is small.

When the past or the present traffic congestion information for the route L3 is "jammed" among three levels of "jammed", "crowded", and "smooth", it is determined that the cost is "large", when "crowded", it is determined that the cost is "middle", and when "smooth", it is determined that the cost is "small." The three level may be classified in the same manner as in VICS information for example, such that, on a general road, "jammed" is 10 km/h or less, "crowded" is 10 km/h-20 km/h, and "smooth" is 20 km/h or greater.

Subsequently, it is estimated that the necessary electric power quantity to the route L3 is given by "the mean electric power consumption"×"the distance of the route L3"×"the electric power consumption cost." The electric power consumption cost may be calculated as a coefficient of 1.3 for "large", 1.0 for "middle", and 0.7 for "small", for example. The estimated necessary electric power quantity is added to the total value at Step S12. In the above, an arbitrary route is used as the already-traveled route; however, it is also conceivable to employ a configuration in which a certain predetermined section may be selected and used as the already-traveled route. It is conceivable to select a certain section of a road which is flat and is not congested for example, as the predetermined section. Accordingly, it is possible to calculate the mean electric power consumption with high accuracy.

On the other hand, at Step S16, when it is determined that the information on the already-traveled route to the vehicle X is not stored in the storage device 102 (Step S16: N), the flow advances to Step S18. This corresponds to such a situation where it is soon after the vehicle X has been purchased as a new car and the information on the already-traveled route is not yet stored. At Step S18, the necessary electric power quantity to the route L3 is estimated as follows, by employing the standard consumption of electric power to the vehicle X, set in advance. Here, the standard consumption of electric power is the mean electric power consumption per unit distance, set in advance corresponding to a vehicle type.

The control device 105 determines the electric power consumption cost as described above (refer to FIG. 8) and estimates that the necessary electric power quantity of the route L3 is given by "the standard consumption of electric power"× "the distance of the route L3"×"the electric power consumption cost." Subsequently, the estimated necessary electric power quantity is added to the total value at Step S12.

Subsequently, at Step S19, it is determined whether calculation of the necessary electric power quantity has been implemented for all guide route. When it has not yet been implemented (Step S19: N), the flow returns to Step S10 in order to calculate the necessary electric power quantity to the remaining guide route. On the other hand, when the calculation of the necessary electric power quantity has been implemented for all guide route (Step S10: Y), the difference between the total value of the necessary electric power quantity and the electricity storage quantity of the vehicle X is calculated, as an excess/deficit of electric power quantity, at Step S20. After the calculation, the total value of the necessary electric power quantity and the excess/deficit of electric power quantity are stored in the storage device 102 for every vehicle ID, as illustrated in FIG. 4. Subsequently, at Step S21, the necessary electric power quantity and the excess/deficit of electric power quantity are transmitted to a vehicular device 200x of the vehicle X.

The center device 100 described above is configured such that the battery charge quantity is transmitted from the vehicular device 200x, and such that the processing is implemented up to the arithmetic processing of the excess/deficit of electric power quantity. However, as a modified example, it is also conceivable to employ a configuration in which the battery charge quantity is not transmitted from the vehicular device 200x, the center device 100 implements up to the calculation of the necessary electric power quantity, and the vehicular device 200x calculates the excess/deficit of electric power quantity.

Figure 9:
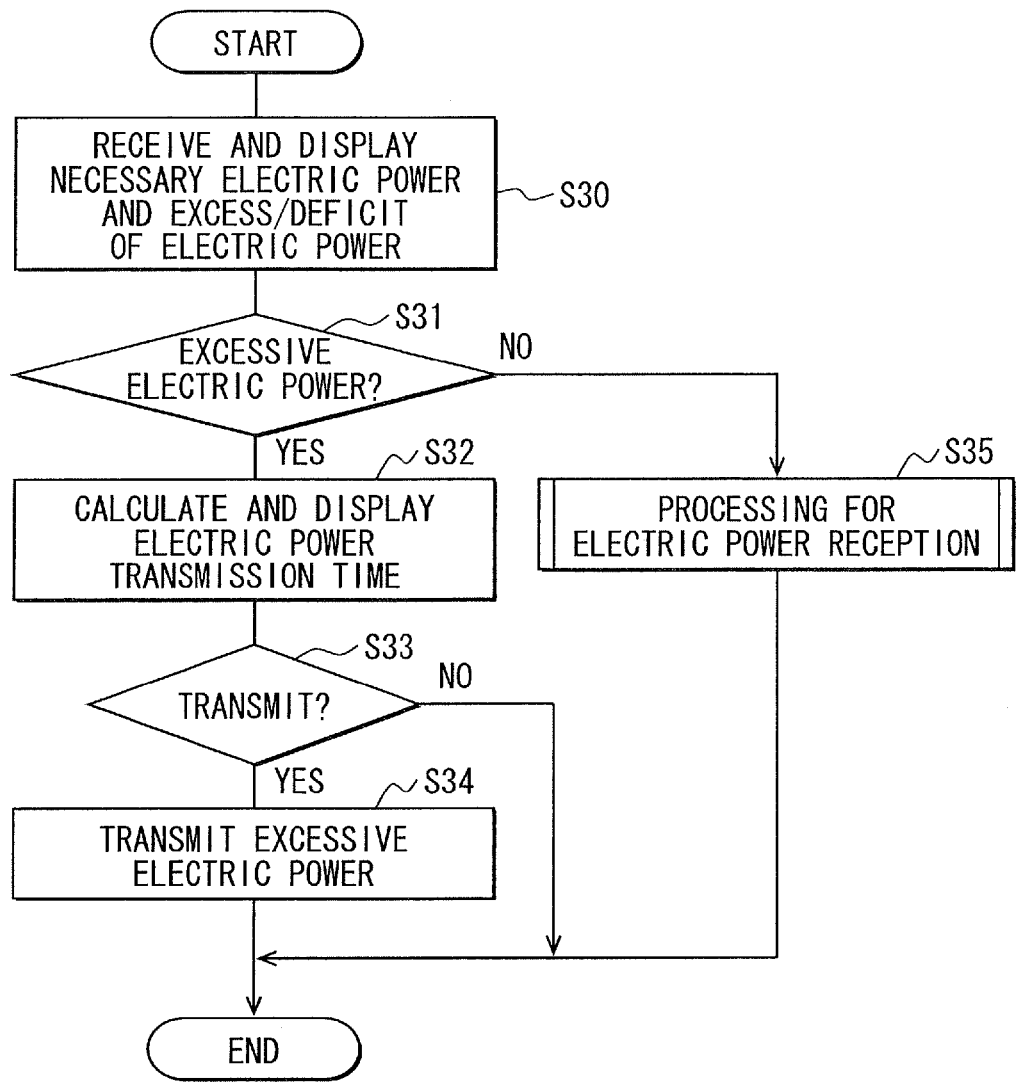
FIG. 9 is a flow chart illustrating electric power transmitting.
Figure 10:
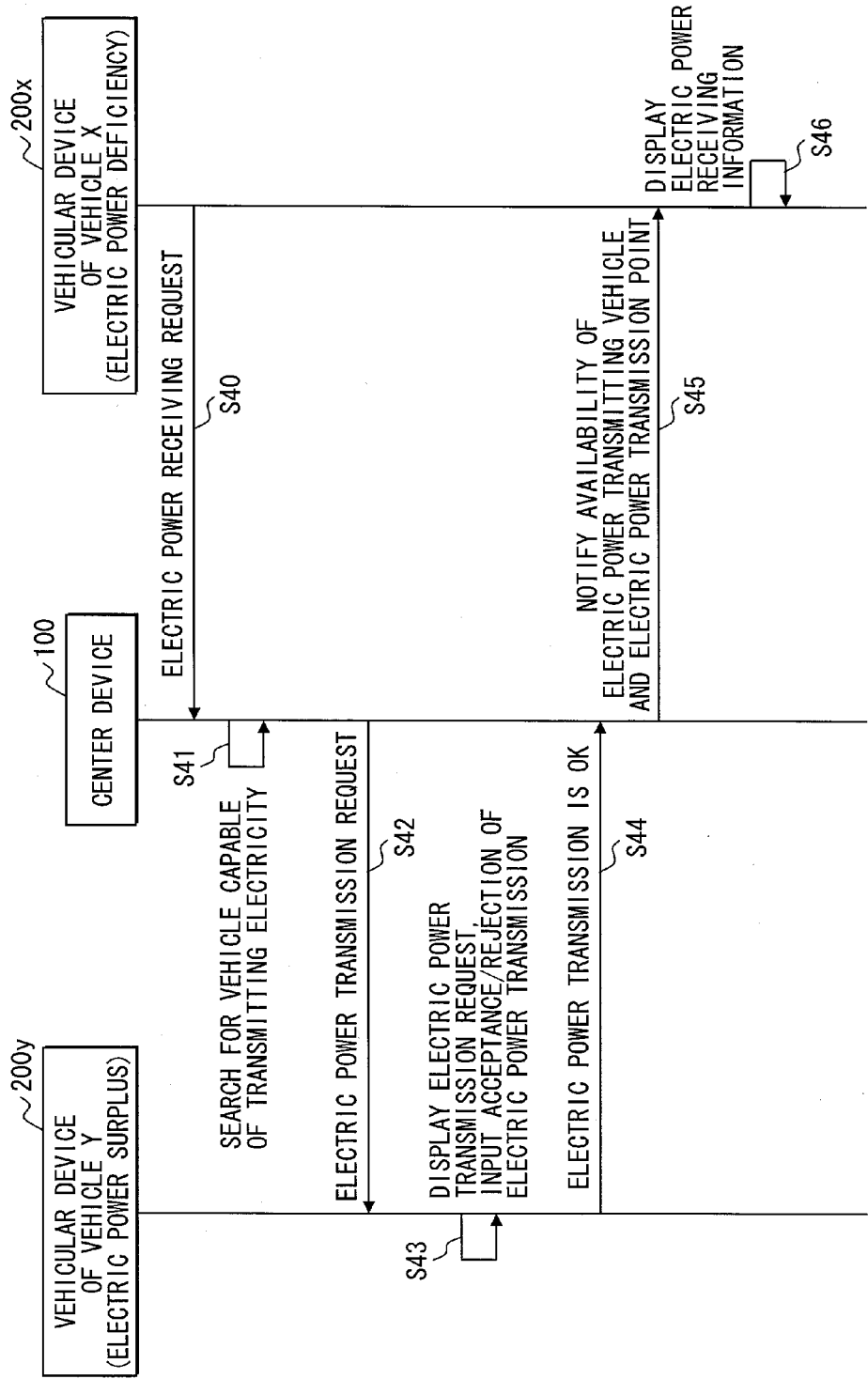
FIG. 10 is a sequence diagram illustrating electric power receiving.

Next, the electric power transmitting and receiving in the vehicular device 200 are explained, with reference to FIGS. 9 and 10. FIG. 9 is a flow chart illustrating electric power transmitting. First, at Step S30, the control device 215 displays on the display 209 the necessary electric power quantity and the excess/deficit of electric power quantity which have been received by the communication device 201. When the excess/deficit of electric power quantity received is an excessive electric power quantity (electric power surplus) (Step S31: Y), the time required to transmit the excessive electric power quantity is calculated at Step S32. For example, the electric power transmission time of the excessive electric power quantity is calculated using the predetermined standard transmitting quantity of electric power per unit time. In the case where electric power is transmitted by employing wireless transmission through the medium of electromagnetic waves via an antenna, and in the case where electric power is transmitted by employing wired transmission using a plug, the electric power transmission time can be calculated using the standard transmitting quantity of electric power per unit time, corresponding to each case. The calculated electric power transmission time is displayed on the display 209.

When a user has instructed electric power transmission by use of the input device 208 (Step S33: Y), an excessive electric power quantity is transmitted to a road side device and the other vehicle (not shown) at Step S34. When the road side device or the other vehicle as an electric power transmission target does not exist in a prescribed distance, the vehicle is moved before the electric power transmitting is implemented.

On the other hand, when the excess/deficit of electric power quantity indicates a deficit of electric power quantity (electric power deficiency), processing for electric power reception is implemented at Step S35. FIG. 10 is a sequence diagram illustrating the processing for the electric power reception. First, at Step S40, the vehicular device 200x of the vehicle X which is in electric power deficiency transmits a notice of an electric power receiving request to the center device 100. At Step S41, the control device 105 of the center device 100 searches for a vehicle which can afford the electric power transmission to the vehicle X. The following explains the processing of search for an electric power transmitting vehicle in the control device 105.

Figure 11:
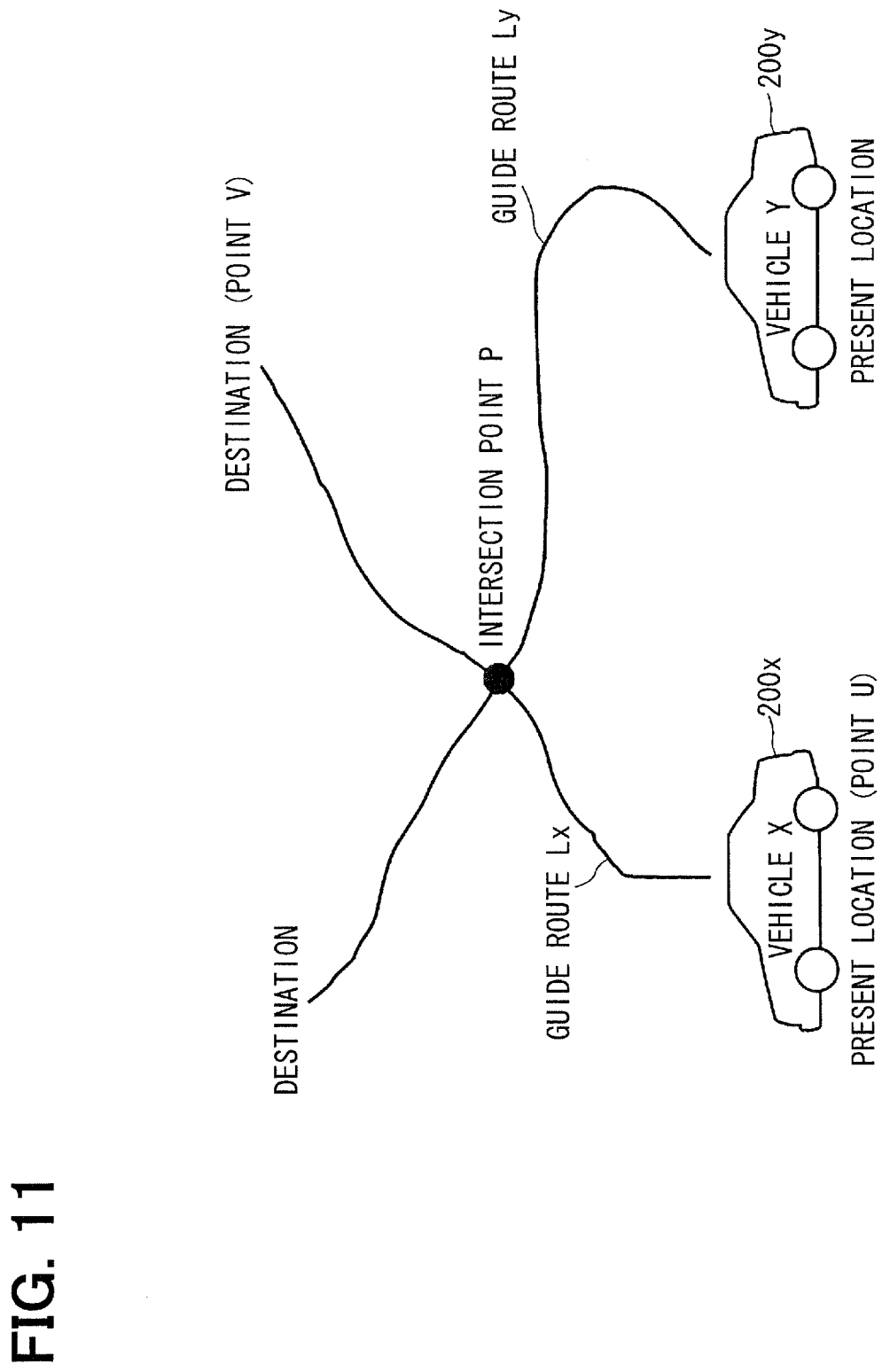
FIG. 11 is a drawing illustrating a relation between a guide route of a vehicle and a guide route of a vehicle.

First, with reference to the excess/deficit of electric power quantity and the guide route information (FIG. 5) of other vehicles other than the vehicle X, stored in the storage device 102, searching is implemented for the other vehicle which has a guide route in the prescribed allowable range of electric power transmission/reception from the guide route of the vehicle X, among the other vehicles which are in an electric power surplus. It may be suggested that the searching is implemented preferentially for the other vehicle which has a guide route overlapping or intersecting with the guide route of the vehicle X. FIG. 11 is a schematic diagram illustrating the guide route Lx of the vehicle X which is in an electric power deficiency, and a guide route Ly of a vehicle Y which is in an electric power surplus. It is considered possible to transmit the electric power from the vehicle Y to the vehicle X, at an intersection point P at which the guide route Lx and the guide route Ly intersect with each other.

When schedule information, such as a departure time of day of the present location and an arrival time of day of the destination, is stored, the time of day to pass the intersection point P is calculated. When there exist multiple other vehicles, like the vehicle Y, which have a guide route in the prescribed allowable range of electric power transmission/reception from the guide route of the vehicle X, searching is implemented for the other vehicle which passes the intersection point P at the same time of day or at a predetermined time late, to the time of day tx when the vehicle X passes the intersection point P. This is because it is more desirable for the vehicle X which demands to be supplied with the electric power to arrive at the intersection point P earlier and to wait for the vehicle Y which supplies the electric power.

In this way, the control device 105 searches for the vehicle Y which can transmit the electric power to the vehicle X. When the surplus electric power quantity of the vehicle Y is less than the deficit of electric power quantity of the vehicle X, the deficit of electric power quantity of the vehicle X cannot be satisfied by the vehicle Y alone; accordingly, multiple other vehicles which meet the above-described conditions may be searched for.

Subsequently, at Step S42, the center device 100 transmits, to a vehicular device 200y of the vehicle Y, the information related to the electric power transmission request to the vehicle X. In the vehicular device 200y of the vehicle Y which has received the information related to the electric power transmission request, the control device 215 displays the information related to the electric power transmission request, on the display 209 (Step S43). For example, the quantity of electric power transmission, the place of the intersection point P where the electric power transmission is to be implemented, and the expected passing time of day of the point P, and in addition, acceptance or refusal of the transmission to the vehicle X are displayed and makes a user to select. Subsequently, when a user selects an electric power transmission acceptance by use of the input device 208, a notice of the electric power transmission acceptance is transmitted to the center device 100 (Step S44). At Step S45, the center device 100 transmits, to the vehicular device 200x of the vehicle X, the information related to the electric power reception from the vehicle Y. At Step S46, in the vehicular device 200x of the vehicle X, for example, an electric power receiving quantity, the place of the point P at which the electric power reception is to be implemented, an expected passing time of day of the point P, and in addition, a message representing that the electric power reception from the vehicle Y is possible are displayed.

Here, in the vehicular device 200y of the vehicle Y, when the electric power transmission to the vehicle X is accepted, it is conceivable to employ a configuration in which various options related to the electric power transmission can be specified. The user of the vehicle Y can specify a quantity of the electric power transmission by means of the options, when the user does not demand to transmit all the surplus electric power. FIG. 12 illustrates an example of the options which can be specified, and the contents. For example, it is conceivable to employ a configuration in which a user can specify an electric power transmission time through the input device 208. The control device 215 calculates the electric power quantity which can be transmitted in the specified electric power transmission time, same as at Step S32.

As an option of the quantity of electric power transmission, it is conceivable to provide specification of an electric power quantity necessary for the traveling distance to the destination of the vehicle X as the electric power transmission target, namely, the deficit of electric power quantity of the vehicle X. As another option of the quantity of electric power transmission, it is also conceivable to employ a configuration in which the degree of margin of the battery charge quantity of the vehicle Y can be specified. That is, when it is desired to keep an enough surplus to the battery charge quantity even after the electric power transmission, the degree of margin "large" is selected, when it is desired to keep the middle degree of surplus, the degree of margin "middle" is selected, and when it is not necessary to keep a surplus, the degree of margin "small" is selected. For example, when the degree of margin is "large", "middle", or "small", 70%, 90%, or 100% of the surplus electric power quantity is calculated as the quantity of electric power transmission, respectively.

It is conceivable to employ a configuration in which modes such as a "quick mode" or a "normal mode" can be specified as an option. For example, when a "quick mode" is selected, the electric power quantity by which the vehicle X can travel 5 km is calculated as the quantity of electric power transmission. On the other hand, when a "normal mode" is selected, the electric power quantity by which the vehicle X can travel 10 km is calculated as the quantity of electric power transmission.

In this way, the quantity of electric power transmission is calculated by the specification of the option by the user of the vehicle Y, and the calculated quantity of electric power transmission is transmitted to the vehicular device 200x of the vehicle X via the center device 100. In the vehicular device 200x of the vehicle X, the control device 215 displays the quantity of electric power transmission received, on the display 209. After the vehicle X and the vehicle Y have moved to the electric power transmission point P, the electric power transmission is implemented from the vehicle Y to the vehicle X. It is conceivable to employ a configuration in which, in order to encourage electric power transmission, points (for example, a bonus which can be converted into money) are offered from the center device 100 to the vehicle Y which has implemented the electric power transmission, corresponding to the quantity of electric power transmission. When the navigation device 103 of the center device 100 has searched for the guide route illustrated in FIG. 5, it is conceivable to transmit, to the vehicle X and the vehicle Y, not only the electric power transmission point P but the guide route information to the destination.

The searching of the electric power transmitting vehicle in the center device 100 illustrated in FIG. 10 (Step S41) may be implemented when the excess/deficit of electric power quantity is calculated at Step S20 of FIG. 7. For example, when the calculation of the excess/deficit of electric power quantity has resulted in a deficit of electric power quantity (electric power deficiency), the searching of an electric power transmitting vehicle may be implemented continuously. In this way, by calculating the necessary electric power quantity to a destination using the traveling history data of the other vehicle, it is possible to calculate a necessary electric power quantity even for a route which the self vehicle has not traveled. In particular, it becomes possible to calculate the necessary electric power quantity with sufficient accuracy, by using the traveling history data of the other vehicle which is an identical or similar vehicle type as the self vehicle.

In transmitting electricity to the exterior of the vehicle, the quantity of electric power transmission is determined based on a battery charge quantity and a necessary electric power quantity calculated in the center device 100. Accordingly, it is possible to restrict the self vehicle from falling into an electric power deficiency after the electric power transmission. At the same time, electric power transmission of the surplus electric power obtained by the recovery of regeneration energy and the like is promoted, contributing to the improvement of the utilization efficiency of electric power energy. Provided that the points are given from the center device 100 to the vehicle which has transmitted electricity, and the points can be exchanged for goods or a cash voucher, it is possible to activate the electric power transmission of surplus electric power.

Even when there is no data of the other vehicle to be used for the calculation of a necessary electric power quantity to a route (target route) which the self vehicle has not traveled, it is possible to estimate the necessary electric power quantity by using the traveling history of the self vehicle in a predetermined route other than the target route, and the traveling environment data stored in the map DB 104 of the center device 100. Accordingly, it is possible to implement the calculation (prediction) of the necessary electric power quantity with the highest possible accuracy, even for a route which the self vehicle has not traveled and of which the data of the other vehicle cannot be collected enough.

Even when the traveling history of the self vehicle cannot be found, it is possible to provide (predict) the necessary electric power quantity of the target route certainly, by using the predetermined standard consumption of electric power and the traveling environment data. Electric power consumption characteristics are determined from the driving characteristics data transmitted from each vehicle, and used for the calculation of the necessary electric power quantity. Specifically, it becomes possible to provide the necessary electric power quantity with higher accuracy, by calculating a necessary electric power quantity by use of the electric power consumption of the other vehicle which has close electric power consumption characteristics to that of the self vehicle, or by determining a necessary electric power quantity after correcting the electric power consumption of the other vehicle by the ratio of consumption characteristics coefficients.

It is possible to reduce the error of the necessary electric power quantity due to a traveling time zone, by considering a traveling time of day and by calculating the necessary electric power quantity based on the electric power consumption at a closer traveling time of day. It is assumed that for example, the quantity of electric power consumption increases relatively in the morning or in the evening because of much traffic congestion, and that on the contrary, the quantity of electric power consumption decreases relatively at midnight because of few traveling vehicles. In this way, there is a possibility that the necessary electric power quantity may increase or decrease according to the traveling time zone. Therefore, it is possible to calculate the necessary electric power quantity with sufficient accuracy, by using the electric power consumption at a time of day closer to the traveling time of day.

By searching for the vehicle Y which can transmit electricity to the vehicle X which is short in the electric power necessary for traveling to a destination and by sending a notice to both vehicles from the center device 100, it is possible to promote the electric power transmission/reception between the vehicles. Even in a road environment in which the electric charging equipment is not prepared, the vehicle X can receive electric power from the vehicle Y in the middle of a guide route; accordingly it becomes possible for the vehicle X to reach the destination.

FIRST MODIFIED EXAMPLE

In the embodiment described above, the configuration is such that the current position and the destination are transmitted from the vehicular device 200 to the center device 100. However, the following modification is also possible. As for the same processing as in the embodiment described above, the description thereof will be omitted.

Figure 13:
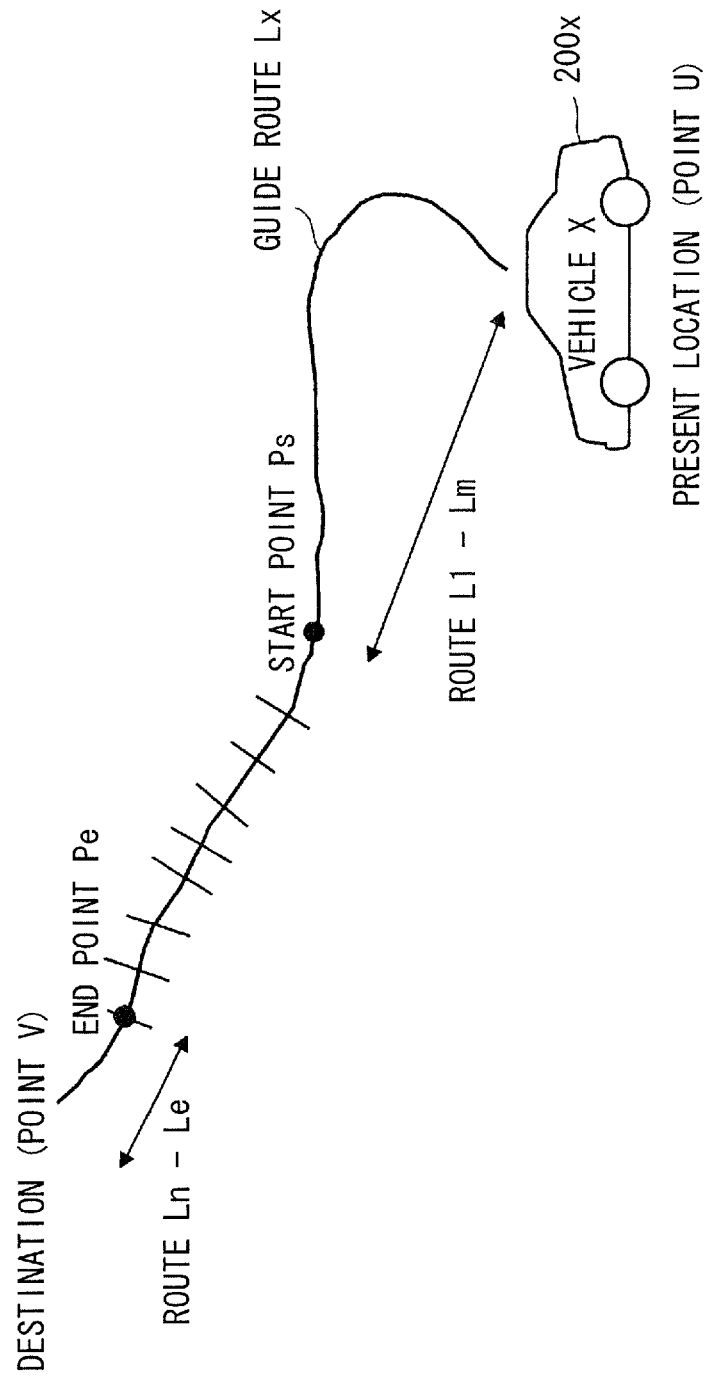
FIG. 13 is a drawing illustrating a guide route from a current position of a vehicle to a destination in First Modified Example.

FIG. 13 illustrates a guide route Lx to the destination of the vehicle X. The control device 215 of the vehicular device 200x determines whether each route which forms the guide route Lx overlaps with the already-traveled route of the vehicle X stored in the storage device 206. In FIG. 13, when a route L1-Lm (the current position—a start point Ps) out of the guide route Lx overlap with the already-traveled route, the control device 215 transmits, to the center device 100, the start point Ps as the departure point. Similarly, when a route Ln-Le (an end point Pe—the destination) out of the guide route Lx overlap with the already-traveled route, the control device 215 transmits, to the center device 100, the end point Pe as the destination. Subsequently, the control device 215 requests the center device 100 to calculate a necessary electric power quantity from the start point Ps (departure point) to the end point Pe (destination), and receives the result.

On the other hand, as for the route overlapping with the already-traveled route of the vehicle X out of the guide route, a necessary electric power quantity is calculated in the vehicular device 200x using the electric power consumption stored in the storage device 206. Then, it is possible to calculate the necessary electric power quantity from the current position (point U) to the destination (point V), by adding together the necessary electric power quantity received from the center device 100 and the necessary electric power quantity calculated in the vehicular device 200x. In this way, it is not necessary to transmit always the current position and the destination, from the vehicular device 200x to the center device 100. It is also conceivable to employ a configuration in which, like the start point Ps and the end point Pe, arbitrary points in the route from the current position to the destination may be transmitted as the departure point and the destination.

Accordingly, it is possible to reduce the quantity of data of the guide route information to be transmitted from the vehicular device 200x to the center device 100. Since the necessary electric power quantity is calculated using the guide route transmitted from the vehicular device 200x, it becomes possible to provide an accurate necessary electric power quantity, compared with the case of using the guide route searched in the center device 100.

SECOND MODIFIED EXAMPLE

In the embodiment described above, the explanation has been made for the information and telecommunications system which includes the center device 100 and the vehicular device 200, which can communicate by radio with each other. However, it is also conceivable to modify the system configurations as follows. As for the same processing as in the embodiment described above, the description thereof will be omitted.

Figure 14:
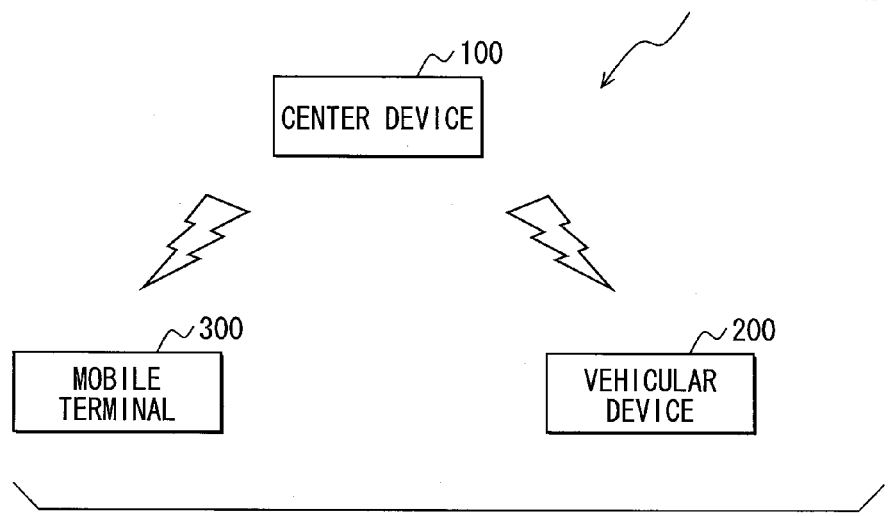
FIG. 14 is a schematic diagram illustrating the entire configuration of an information and telecommunications system in Second Modified Example.

FIG. 14 illustrates an entire configuration of an information and telecommunications system 2 which includes the center device 100, the vehicular device 200, and a mobile terminal 300. The mobile terminal 300 is a mobile-phone, for example, and possesses a function for communicating with the center device 100 by radio. The mobile terminal 300 transmits, to the center device 100, the departure point and the destination which have been specified by the user, together with a mobile terminal ID for identifying the mobile terminal and a vehicle ID (for example, vehicle ID=X). That is, the departure point and the destination are transmitted from the mobile terminal 300 instead of the vehicular device 200. Here, the mobile terminal ID is a serial number stored in the mobile terminal 300, for example.

The center device 100 recognizes that the departure point and the destination received from the mobile terminal 300 are the departure point and the destination of the vehicle X (vehicle ID=X), and calculates the necessary electric power quantity, as is the case with the embodiment described above. Subsequently, the calculated necessary electric power quantity is transmitted to the mobile terminal 300. The mobile terminal 300 displays the received necessary electric power quantity on a liquid crystal display (not shown). Accordingly, even when a user is not in a vehicle, the user can know the necessary electric power quantity to the destination. For example, if the necessary electric power quantity can be known on the preceding day of the departure, it will become possible to take a necessary measure even for the case of an insufficient electricity storage quantity, in such a way that the battery 212 will be charged enough in the electric charging equipment of the user's house.

(Second Embodiment)

An information and telecommunications system according to Second Embodiment is explained with reference to FIG. 15 through FIG. 23. Second Embodiment differs from First Embodiment in a point that when the electric power of a self vehicle is insufficient, not the other vehicle but electric charging facilities are searched for. The configurations of the center device 100 and the vehicular device 200 are the same as those of First Embodiment; therefore, the detailed explanation thereof is omitted.

In an electric vehicle (including what is called a hybrid vehicle), the electric power as a result of collecting regeneration energies turns into surplus electric power. In that case, there might be a case where the absolute quantity of the surplus electric power is little and no other vehicle having surplus electric power exists near the self vehicle, depending on a time zone. Accordingly, in the present embodiment, a home (ordinary home) is rendered as one of options serving as electric charging facilities in which the electric charging to the self vehicle is possible when the electric power of the self vehicle is insufficient.

Figure 15:
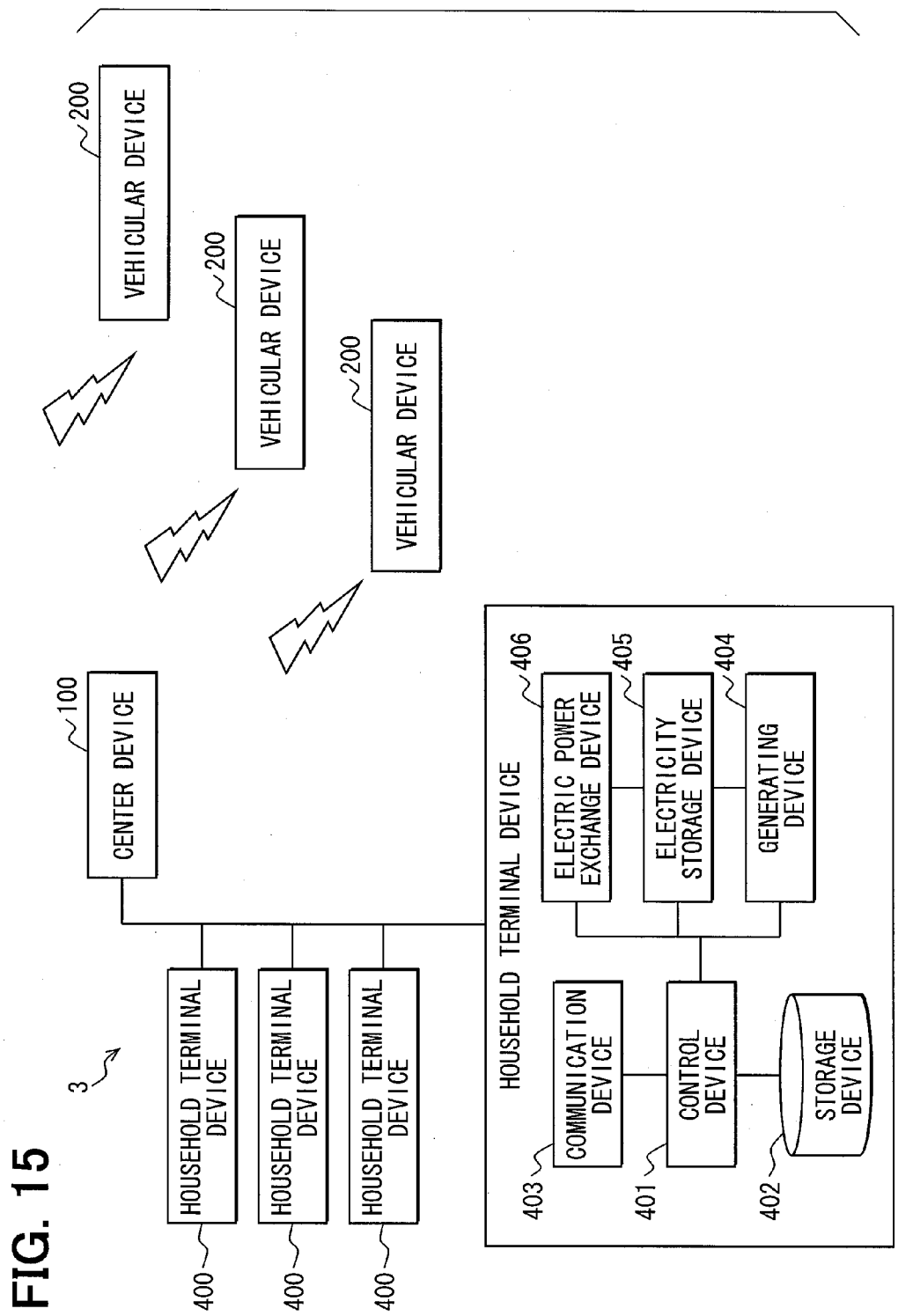
FIG. 15 is a schematic diagram illustrating the entire configuration of an information and telecommunications system in Second Embodiment.

As illustrated in FIG. 15, the information and telecommunications system 3 according to Second Embodiment includes multiple household terminal devices 400 which may correspond to a household terminal unit, in addition to the center device 100 and the vehicular device 200. The household terminal device 400 is located in a home. The household terminal device 400 includes a control device 401, a storage device 402, a communication device 403 which may correspond to the home-side communication unit, a generating device 404 which may correspond to the home-side electric power generation unit, an electricity storage device 405 which may correspond to the home-side electricity storage unit, and an electric power transmission/reception device 406 which may correspond to the home-side electric power transmission/reception unit. In the home equipped with such a household terminal device 400, when the electric power generated by the generating device 404 (for example, a solar power generation device and others) exceeds the electric power consumption in the home and surplus electric power is developed, the surplus electric power is sold to an electric power company, stored in the electricity storage device 405, or used for charging an electric vehicle owned by a resident.

The control device 401 of the household terminal device 400 is configured with a microcomputer, for example. The control device 401 controls the entire household terminal device 400 according to the computer program stored in the storage device 402, for example. The communication device 403 implements communications of various kinds of information with the center devices 100. The generating device 404 is configured with a solar power generation device, for example, and generates all or a part of the electric power consumed in the home. The electricity storage device 405 stores the electric power generated by the generating device 404, and the surplus electric power, for example. The electric power transmission/reception device 406 implements the reception of electric power from an electric power company, the transmission of surplus electric power, or electric power supply to an electric vehicle.

In the information and telecommunications system 3 equipped with such a household terminal device 400, the center device 100 collects electric power information which is information on electric power consumption and surplus electric power, for example, in each residence (each home), as will be described later. The information and telecommunications system 3 assists electric power supply to a vehicle based on the electric power information collected by the side of the center device 100 as follows, when the vehicle falls in electric power deficiency.

Figure 16:
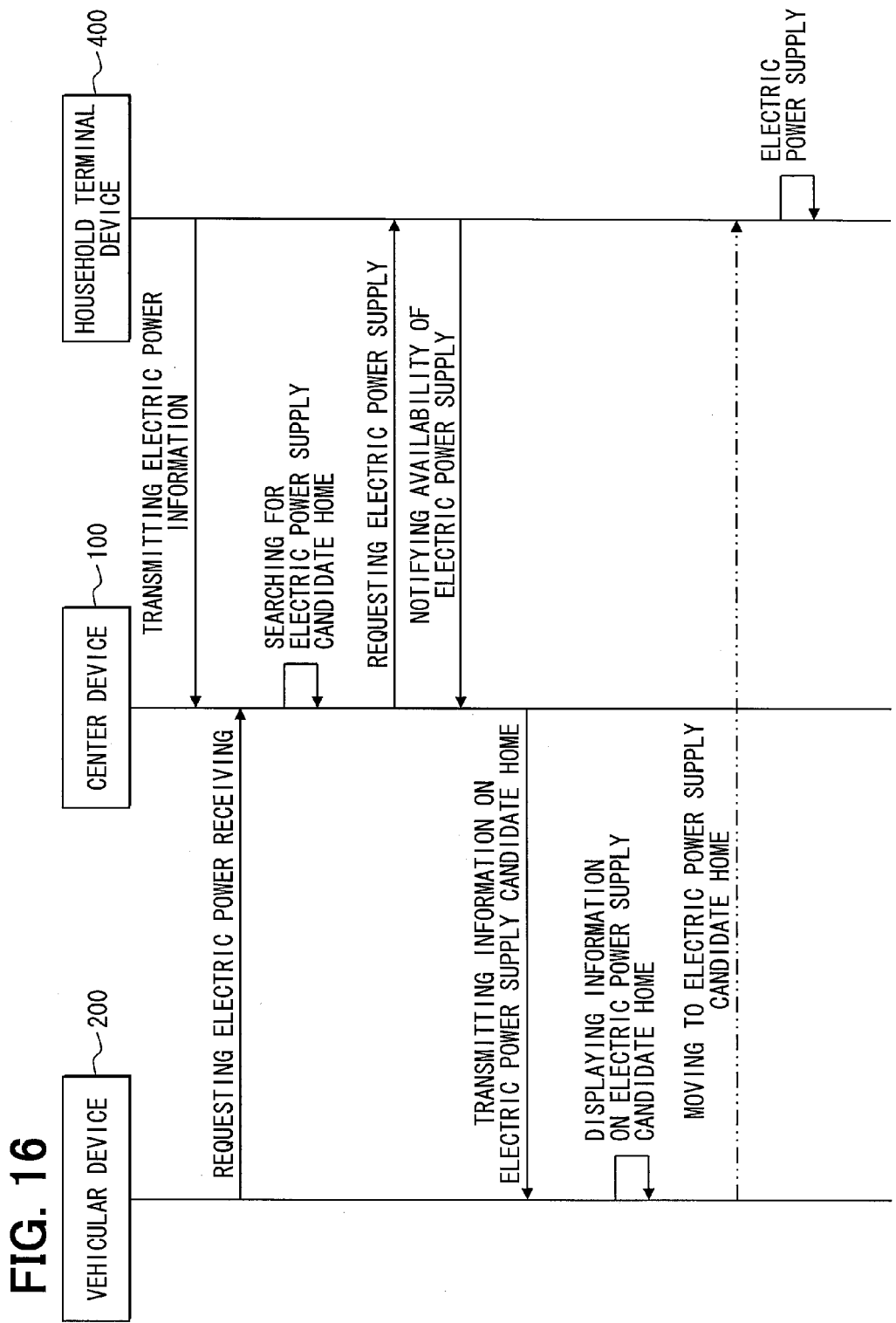
FIG. 16 is a sequence diagram illustrating electric power receiving.

First, with reference to FIG. 16, the rough flow of processing will be explained in the vehicular device 200, the center device 100, and the household terminal device 400 in cases where the electric power of the vehicle is insufficient. The vehicular device 200 determines the excess and deficiency of the remaining electric power of the vehicle as is the case with First Embodiment and others. When the vehicular device 200 determines that the remaining electric power of the vehicle is not sufficient to arrive at a destination, that is, in a state of a deficit of electric power quantity, the vehicular device 200 transmits an electric power receiving request to the center device 100. It is also conceivable to employ a configuration in which the center device 100 determines the excess and deficiency of the remaining electric power of the vehicle and notifies it to the vehicular device 200. Upon receiving the electric power receiving request, the center device 100 searches for an electric power supply candidate home (a home which can afford the electric power supply to the vehicle). In the case of the present embodiment, regardless of whether the electric power receiving request is received or not, the center device 100 is collecting the electric power information based on various kinds of information received from the household terminal device 400, and determines an electric power supply candidate home from the electric power information.

Next, the center device 100 transmits an electric power supply request to the searched electric power supply candidate home. The household terminal device 400 which has received the electric power receiving request replies to the center device by transmitting a notice indicating the acceptance/rejection of the electric power reception, for example, a notice indicating that the charging is possible. Then, the center device 100 transmits the information on the electric power supply candidate home to the vehicular device 200, when the notice indicating that the electric power reception is possible has been received. The information on the electric power supply candidate home includes the address and others, for example. Upon receiving the information on the electric power supply candidate home, the vehicular device 200 displays the information on an electric power supply candidate home on the display 209 or the like. In this case, it is naturally conceivable to display not only the address but also the route to the address. A user moves to the electric power supply candidate home according to the displayed information on the electric power supply candidate home. Then, the household terminal device 400 of the electric power supply candidate home supplies the electric power to the vehicle (electric power supply) by use of the electric power transmission/reception device 406. In this way, the information and telecommunications system 3 assists the electric power supply.

Next, the details of each processing are explained. Taking the vehicular device 200 as an example, the following processing is executed by the control device 215. However, for the sake of simplification, the explanation will be made by assuming that the subjects are the vehicular device 200, the center device 100, or the household terminal device 400. In each flow chart, the case of "yes" in the determination processing is expressed as "S101: Y", for example, and the case of "no" in the determination processing is expressed as "S101: N", for example.

Figure 17:
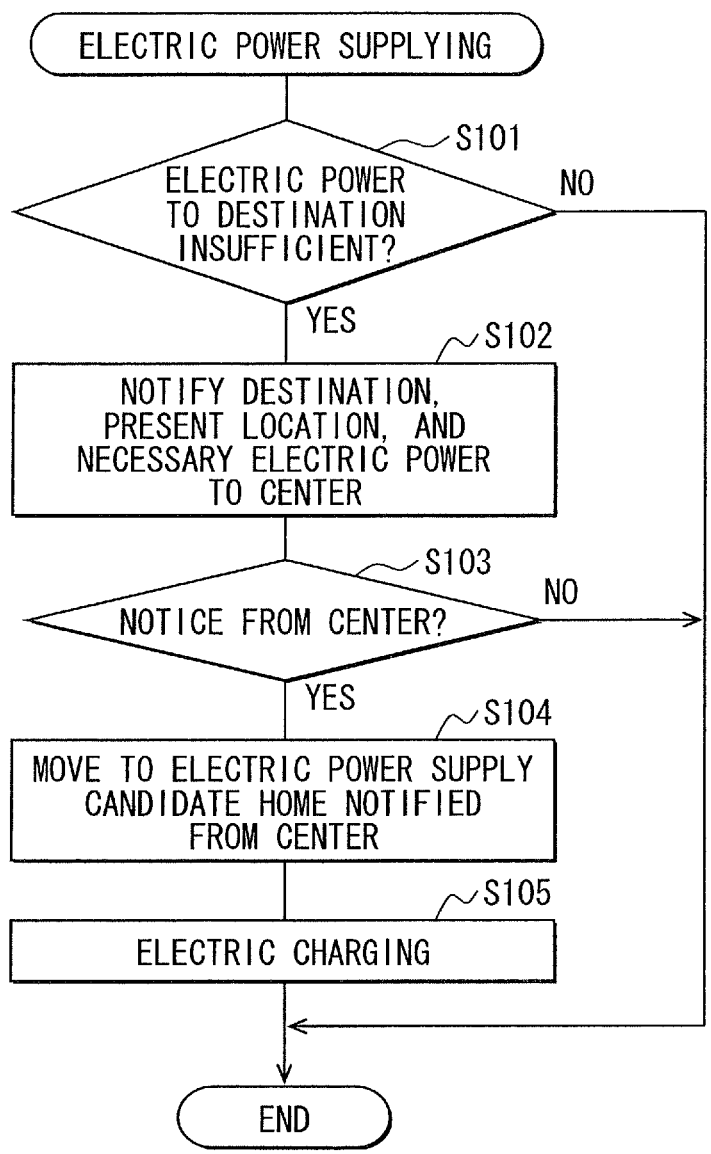
FIG. 17 is a flow chart illustrating electric power supplying.

FIG. 17 illustrates the flow of the electric power supplying by the vehicular device 200. When it is determined that the electric power to the destination is insufficient (S101: Y), the vehicular device 200 transmits the destination, the present location, and the required electric power quantity as an electric power receiving request to the center device 100 (S102). At Step S101 and Step S102, it is assumed that calculation of a guide route and calculation of an electric power quantity are implemented by the vehicular device 200. In the present case, as is the case with First Modified Example described above, it is also conceivable to employ a configuration in which the required electric power quantity to the destination is calculated in the center device 100, based on the guide route, more specifically, based on the departure point and the destination of the self vehicle 500. In that case, a notice of electric power deficiency is given from the center device 100 to the vehicular device 200, and the response to it is replied from the vehicular device 200.

Subsequently, the vehicular device 200 determines whether a notice has been given from the center device 100 (S103). When the information related to a home (electric power supply candidate home) which can afford the electric power supply to the self vehicle has been notified from the center device 100 (S103: Y), the vehicular device 200 moves to the notified electric power supply candidate home. Subsequently, the vehicular device 200 implements charging, after arriving at the electric power supply candidate home (S105). On the other hand, when there is no notice sent from the center device 100 (S103: N), the vehicular device 200 terminates the processing. In this case, the user of the self vehicle charges the self vehicle by requesting to an electric charging service contractor, for example.

Figure 18:
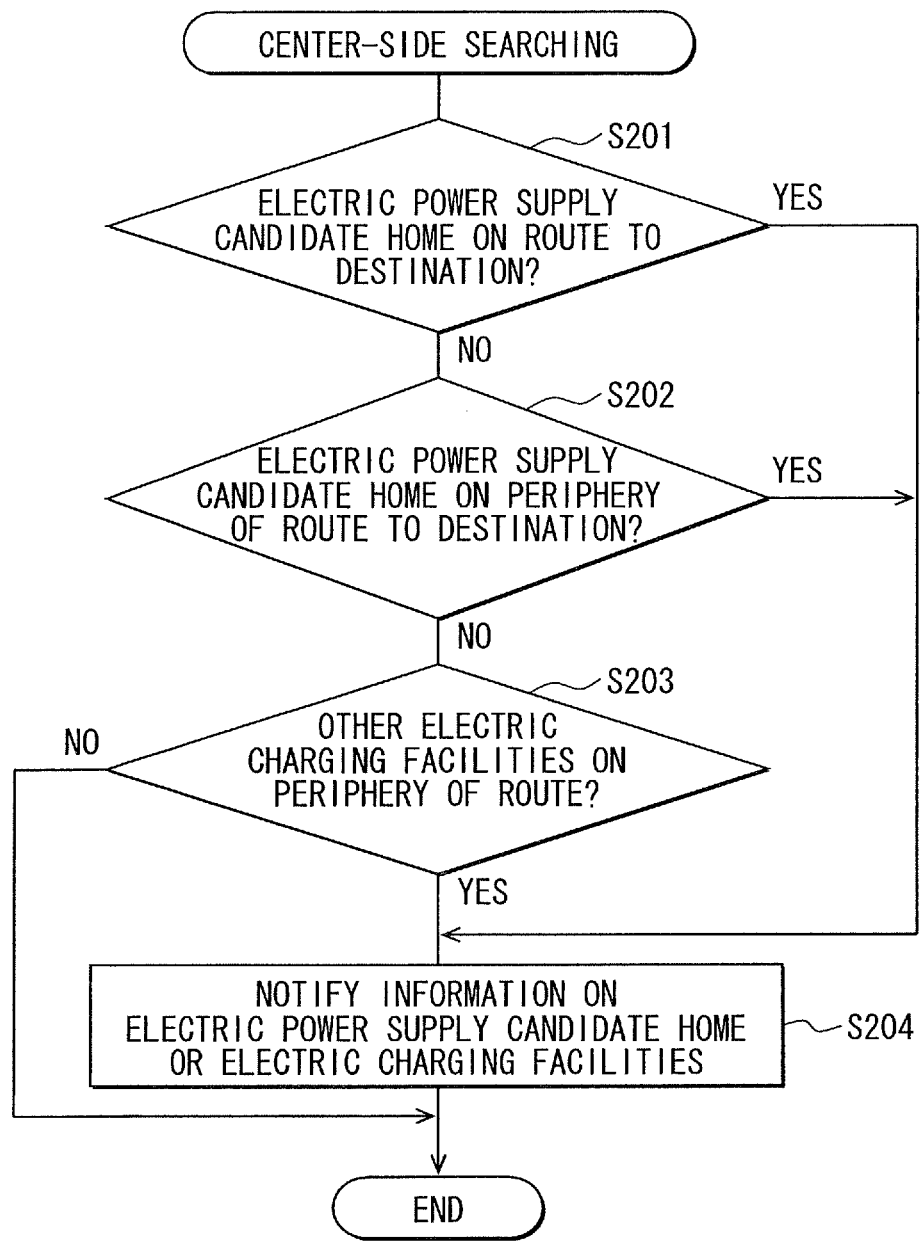
FIG. 18 is a flow chart illustrating center-side searching.

Next, the search process of an electric power supply candidate home implemented by the center device 100 at Step S103 is explained. As illustrated in FIG. 18, upon receiving the electric power receiving request from the vehicular device 200, the center device 100 determines whether an electric power supply candidate home exists on the route to the destination (S201), or whether an electric power supply candidate home exists on the periphery of the route to the destination (S202), or whether other electric charging facilities exist on the periphery of the route (S203). When there exist an electric power supply candidate home or electric charging facilities (S201: Y, S202: Y, or S203: Y), the center device 100 transmits the information on the electric power supply candidate home or the electric charging facilities to the vehicular device 200 (S204). Here, the electric charging facilities are a public charging stand or a commercial charging stand, for example. That is, the information and telecommunications system 3 according to the present embodiment also searches for the facilities capable of implementing electric power supply to a vehicle, besides the home.

Figure 19:
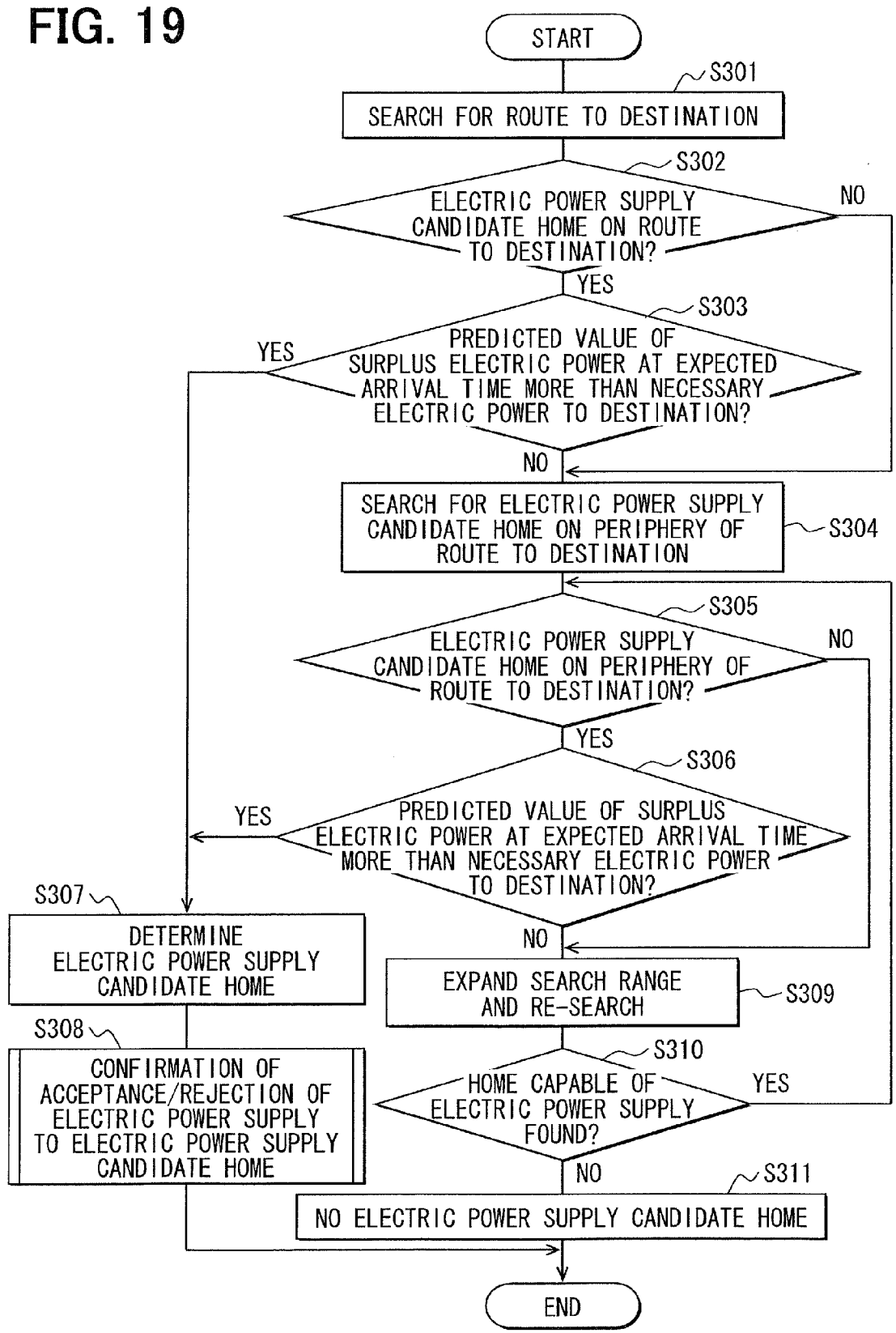
FIG. 19 is a flow chart illustrating the details of the center-side searching.
Figure 20:
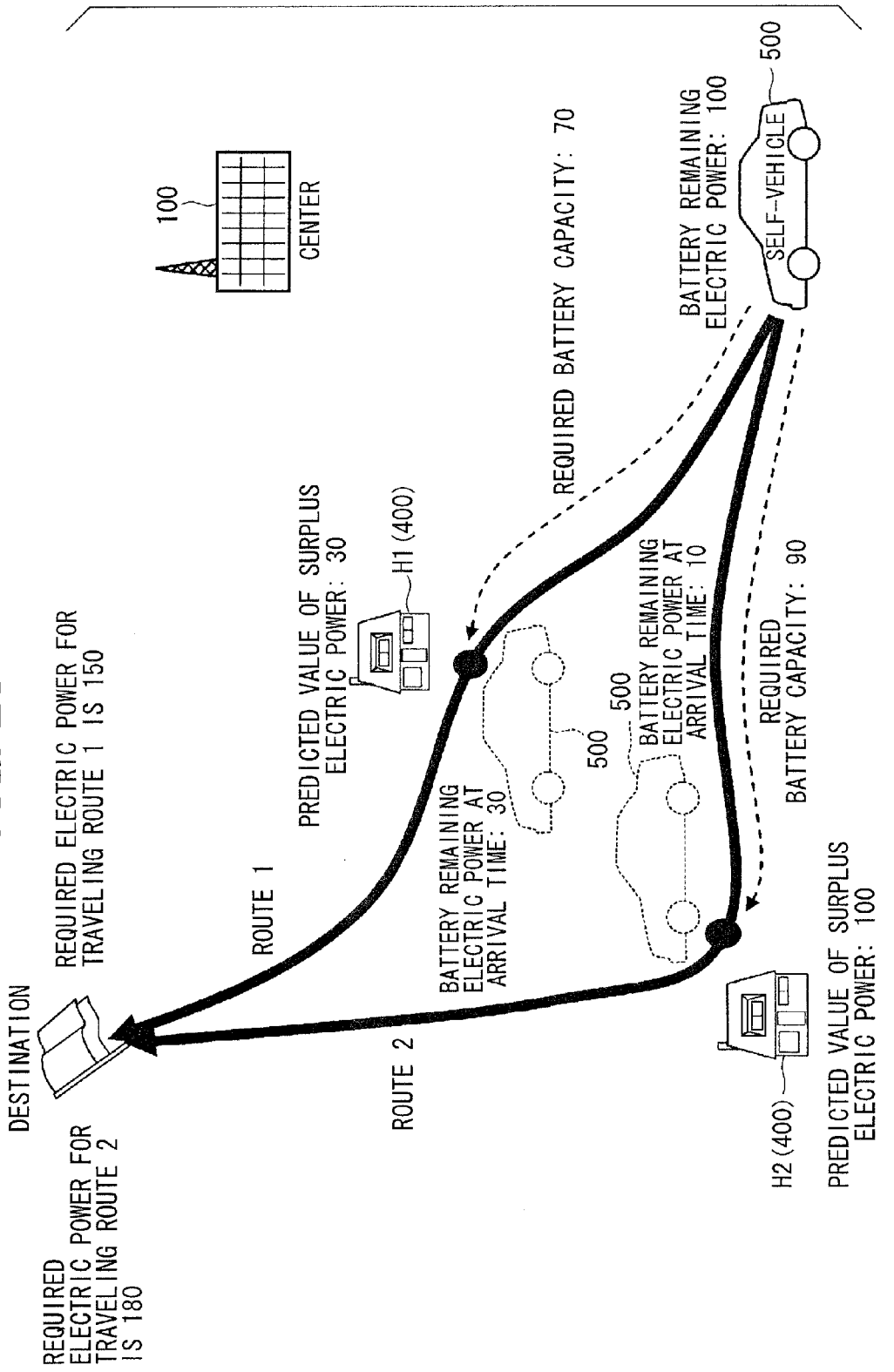
FIG. 20 is a drawing illustrating the positional relationship of a guide route of a vehicle and a home.

In more details, the center device 100 searches for a route to the destination first, as illustrated in FIG. 19 (S301). When the information on the route itself is transmitted from the vehicular device 200, the information may be utilized. Subsequently, the center device 100 determines whether an electric power supply candidate home exists on the route to the destination (S302). For example as illustrated in FIG. 20, it is assumed that a home H1 equipped with a household terminal device 400 exists on a route 1 as the guide route to the destination of the self vehicle 500. It is also assumed that the battery remaining electric power of the self vehicle 500 is 100 and that the predicted value of surplus electric power of the household terminal device 400 is 30 at the time of day when the self vehicle 500 arrives. It is further assumed that a home H2 equipped with a household terminal device 400 with a predicted value of surplus electric power of 100 exists on a route 2 on the periphery of the route 1 as the guide route. It is assumed that the required electric power quantity in the case of traveling the route 1 is 150, and that the required electric power quantity in the case of traveling the route 2 is 180.

In the present case, the center device 100 determines whether the self vehicle 500 can reach the destination, based on the required electric power quantity (150) in the case of traveling the route 1, the battery remaining electric power (100) of the self vehicle 500, the predicted value of surplus electric power (30) of the home H1, and the required battery capacity (70) to the home H1. In the present case, the total electric power after charging the electric power of 30 at the home H1 is 100−70+30=60; accordingly, it is less than the necessary electric power to the destination (150−70=80). That is to say, the self vehicle 500 cannot travel to the destination, even if charging is implemented at the home H1.

In such a case, the predicted value of surplus electric power at a vehicle's expected arrival time is not more than the necessary electric power to the destination (S303: N), therefore, the center device 100 searches for an electric power supply candidate home on the periphery of the route to the destination (S304). A home H2 exists on the route 2 as a periphery route to the destination (S305: Y), therefore, the center device 100 determines whether the predicted value of surplus electric power at the vehicle's expected arrival time at the home H2 is more than the necessary electric power to the destination (S306). Specifically, as illustrated in FIG. 20, it is determined whether the self vehicle 500 can reach the destination, based on the required electric power quantity (180) in the case of traveling the route 2, the battery remaining electric power (100) of the self vehicle 500, the predicted value of surplus electric power (100) of the home H2, and the required battery capacity (90) to the home H2. In the present case, the total electric power after charging the electric power of 100 at the home H2 is 100−90+100=110, and greater than the necessary electric power (180−90=90) to the destination. That is to say, the self vehicle 500 can travel to the destination, if charging is implemented at the home H2.

Figure 21:
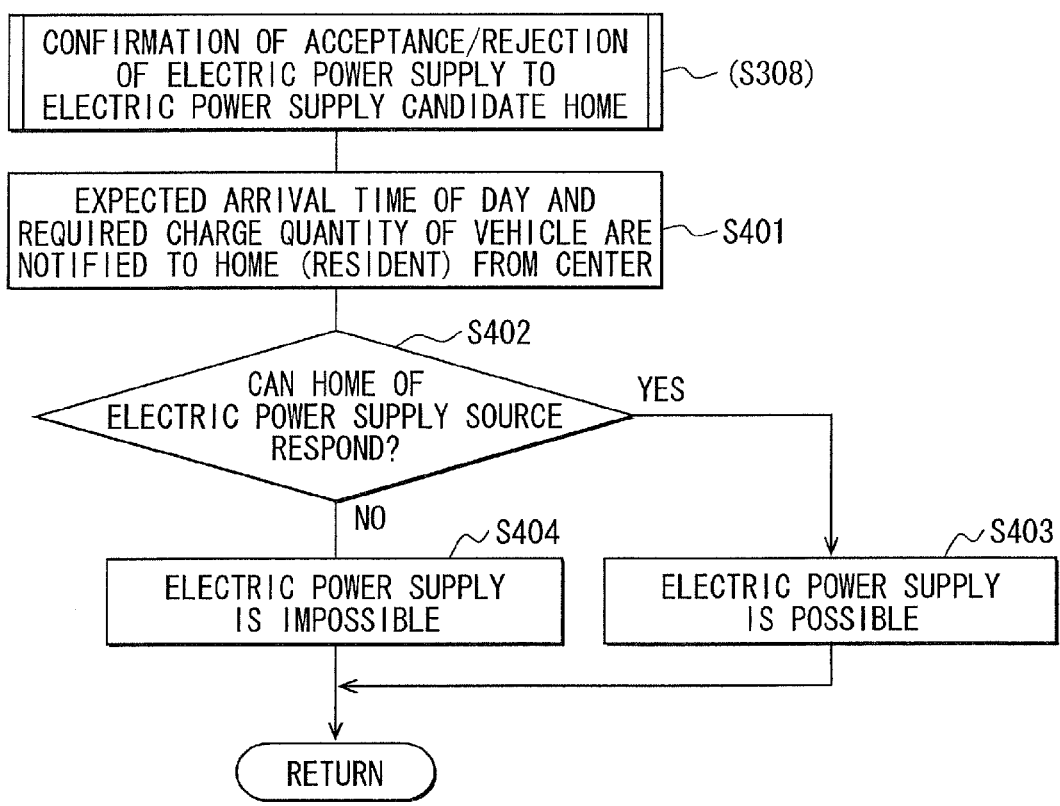
FIG. 21 is a flow chart illustrating confirming of acceptance/rejection of electric power supply.
Figure 22:
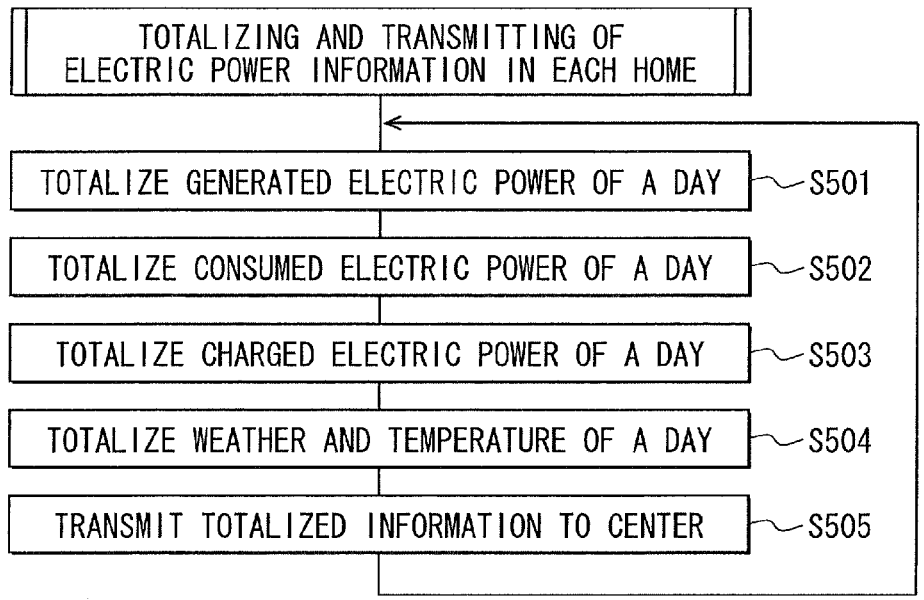
FIG. 22 is a flow chart illustrating totalizing and transmitting of electric power information in each home.

In such a case, since the predicted value of surplus electric power is more than the necessary electric power to the destination (S306: Y), the center device 100 determines the home H2 as an electric power supply candidate home (S307). Subsequently, the center device 100 executes confirmation of acceptance/rejection of electric power supply for confirming the acceptance/rejection of electric power supply in the determined electric power supply candidate home (S308). In the confirmation of acceptance/rejection of electric power supply, the expected arrival time of day and the required charge quantity of the self vehicle 500 are notified to the home H2 (resident) from the center device 100 first (S401), as illustrated in FIG. 21. In the present case, the center device 100 notifies to the household terminal device 400 and in addition directly to a resident's mobile-phone, for example, in the present embodiment.

Upon receiving the notice, the household terminal device 400 or the resident informs the center device 100 of the acceptance/rejection of the response. When informed of the acceptance of the response from the resident (S402: Y), the center device 100 determines that the electric power supply is possible (S403), and the flow returns. On the other hand, when informed of the rejection of the response from the household terminal device 400 or the resident (S402: N), the center device 100 determines that the electric power supply is impossible (S404), and the flow returns.

After returning from the confirmation of acceptance/rejection of electric power supply, when the electric power supply is determined possible, the center device 100 notifies the vehicular device 200 of the information on the electric power supply candidate home, for example, the address and others, at Step S204 of FIG. 18. On the other hand, when the electric power supply is determined impossible, the flow shifts to Step S309 of FIG. 19, and the center device 100 searches for other electric power supply candidate homes, expanding the search range. When a home which can afford the electric power supply is not found, in spite of having expanded the search range (S310: N), it is determined that there is no electric power supply candidate home, and the center device 100 searches for other electric charging facilities at Step S203 of FIG. 18, or notifies the vehicular device 200 that charging is not possible.

Here, collection of the electric power information in the center device 100 is explained. In the totalizing and transmitting of the electric power information illustrated in FIG. 22, the household terminal device 400 implements totalizing of the generated electric power quantity of a day at a home (S501), totalizing of the consumed electric power of a day (S502), totalizing of the charged electric power quantity of a day (S503), and totalizing of environmental information, such as the weather, temperature of a day (S504). The household terminal device 400 stores the totalized information to the storage device 402, and transmits the totalized information to the center device 100 via the communication device 403 (S505). Regardless of whether there is electric power supply demand or not, the household terminal device 400 repeats these processing, periodically or continuously.

Figure 23:
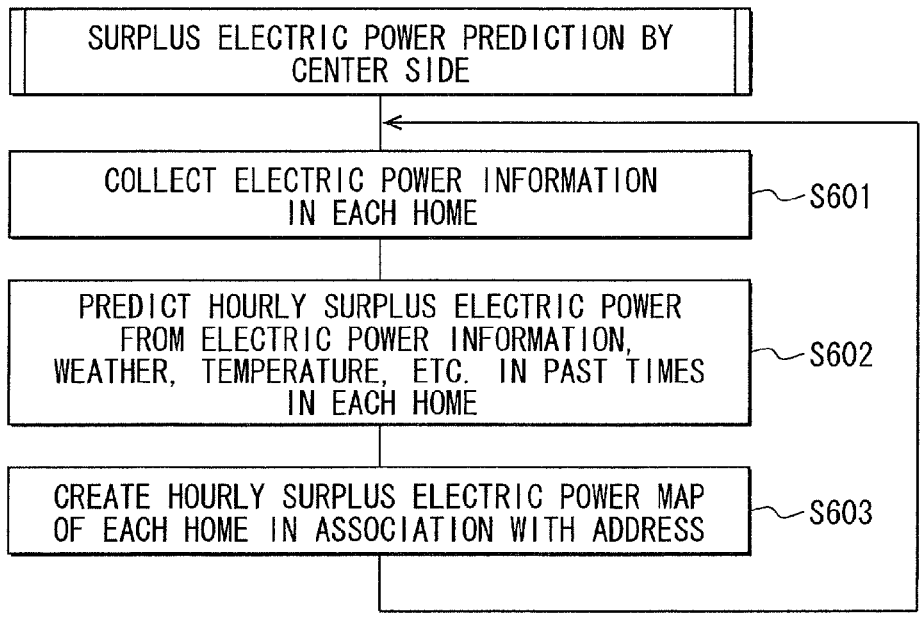
FIG. 23 is a flow chart illustrating surplus electric power prediction on the side of a center.

On the other hand, in the processing of the surplus electric power prediction illustrated in FIG. 23, the center device 100 collects the electric power information in each home transmitted from the household terminal device 400, and stores it in the storage device 102 (S601). The center device 100 predicts the surplus electric power for every hour, from the electric power information, the environmental information such as the weather and temperature, and others in each home, based on the collected electric power information and the past electric power information stored in the storage device 102 (S602). Subsequently, the center device 100 creates a surplus electric power map (corresponding to the predicted value of surplus electric power) which associates the address of each home with the surplus electric power for every hour in each home (S603). Regardless of whether or not there is electric power supply demand from a vehicle, the center device 100 implements these processing. When there is an electric power supply demand from a vehicle, the center device 100 searches for an electric power supply candidate home at Step S302 of FIG. 19, and others, based on the surplus electric power map. Accordingly, it becomes possible to implement the search quickly.

The information and telecommunications system 3 according to Second Embodiment explained above brings about the following effects.

When the self vehicle 500 has fallen in electric power deficiency, the information and telecommunications system 3 searches for an electric power supply candidate home (home which serves as an electric power supply source) which has electric power to be supplied to the self vehicle 500, based on the guide route of the self vehicle 500. It is considered that homes like an ordinary home exist more than charging stands along the guide route. Therefore, more number of charging places can be secured by including the homes in a search target as an electric power supply source to the self vehicle 500. Accordingly, it is possible to notify the self vehicle 500 which has fallen in electric power deficiency, of more number of places where facilities capable of electric power supply exist. Accordingly, it is possible to assist the electric power supply to a vehicle of electric power deficiency, and hence convenience is improved.

The information and telecommunications system 3 searches for a home which is equipped with the generating device 404 and the electricity storage device 405 and which stores surplus electric power, as an electric power supply candidate home. In this way, by enabling supply of surplus electric power to an electric vehicle rather than only storing it, the surplus electric power can be utilized effectively in both sides of the resident of a home with the surplus electric power, and the user who demands to charge the self vehicle 500. The surplus electric power in a home is easy to make statistical prediction compared with the other vehicles which are moving. The information of predicted quantity of surplus electric power in winter time can be appropriately obtained, in the center device 100, by storing as a history a generated electric power quantity and a consumed electric power quantity and a charged electric power quantity in the past, and the daily environmental information such as the weather and temperature, and by predicting a surplus electric power quantity based on the weather, temperature, etc. of the day. It is possible to expect that the electric generating capacity and the charging capacity to produce the surplus electric power in a home are larger than the counterparts of a vehicle; accordingly, there is an increasing possibility that sufficient electric power can be supplied to the self vehicle 500.

The center device 100 stores the history of the past quantity of electric power supply, calculates a predicted value of surplus electric power at an expected arrival time of day of a vehicle based on the history, and searches for an electric power supply candidate home. Accordingly, it is possible to reduce a possibility that the quantity of electric power supply is in short when the self vehicle 500 reaches the electric power supply candidate home. In the present case, since the history of the past quantity of electric power supply is stored in association with the environmental information such as a time zone and the weather of the electric power supply candidate home concerned, it is possible to make more precise prediction of the available electric power quantity. The center device 100 calculates a predicted value of surplus electric power quantity of a home for every hour, and creates a surplus electric power map associated with the address of each home and others. Accordingly, it is possible to search for an electric power supply candidate home quickly in the center device 100, and it is also possible to provide the information promptly to the self vehicle 500 which needs electric charging.

When there exists no electric power supply candidate home on the guide route of the self vehicle 500, the center device 100 searches for whether there exists any electric power supply candidate home on the periphery of the guide route. In the present case, the center device 100 searches for other electric power supply candidate homes which can supply the electric power enough to travel to the destination, expanding the search range. Accordingly, although the route to a destination may be a detour, it is possible to search for an electric power supply candidate home which can surely supply the electric power required for traveling to the destination. When an electric power supply candidate home is not found, in spite of having expanded the search range to the periphery of the guide route, searching is made for the electric charging facilities which have facilities for implementing electric charging to the self vehicle 500, such as an electric charging spot. Therefore, it is possible to reduce a possibility that the self vehicle 500 cannot run any more.

In the confirmation of acceptance/rejection of electric power supply, the center device 100 notifies a resident of an expected arrival time of day, a required charge quantity, and others of the self vehicle 500, directly or via the household terminal device 400. Accordingly, even if the resident is absent when the notice is given from the center device 100, it becomes possible to implement electric power supply as long as the resident is at home at the expected arrival time of day of the self vehicle 500. Accordingly, it is possible to enhance the possibility that the electric power supply is available.

(Other Embodiments)

The present invention can combine appropriately the components of the embodiments described above, and according to the combination, many variations are possible as described in the following. When the self vehicle has fallen in electric power deficiency, it is conceivable to combine searching of the other vehicle according to First Embodiment and searching of a home according to Second Embodiment. There may be cases where, for example, the other vehicle which can afford electric power supply to the self vehicle 500 in electric power deficiency does not exist in a search range or a charging stand or the like does not exist in the neighborhood of the self vehicle 500. Even in such cases, it can be expected that the number of places which can supply electric power near the self vehicle 500 increases by including homes assumed to exist near the guide route as the search target. Accordingly, it is possible to reduce a possibility that the self vehicle 500 cannot run any more, and hence convenience is improved.

In Second Embodiment, the surplus electric power of the home of the electric power supply target is just a predicted value, and it is likely that the weather may change by the time the self vehicle 500 arrives at the target home, so that the electric charging is not practicable, or it is likely that the target home may consume much of the electric power, so that the surplus electric power becomes less than the predicted value. In that case, a home which can afford electric power supply may be searched again in the center device 100, or, the electric charging is implemented at the home even if it is insufficient, and from the point of time, another home which can afford electric power supply may be searched for again. That is, it is conceivable to search for multiple electric power supply candidate homes on the route to the destination. Accordingly, traveling to the destination can be assisted reliably.

In Second Embodiment, an ordinary home is made into the search target as an electric power supply candidate home; however, the home made into the search target may include a convenience store, a company, etc., for example. That is, the "home" described in the claim is not restricted only to an ordinary home.

Summarizing the above embodiments, the information and telecommunications system is configured with the vehicular device and the center device, which are equipped with respective communication units for communicating with each other. The center-side storage unit stores traveling history data transmitted from multiple vehicles each equipped with the vehicular device. The center-side control unit calculates the necessary electric power quantity required for traveling a first route, which does not overlap with the already-traveled route of the self vehicle, in the guide route to be traveled by the self vehicle, based on the traveling history data of the other vehicle stored in the center-side storage unit.

In this way, by calculating the necessary electric power quantity based on the traveling history data of the other vehicle in the center device, it is possible to calculate the necessary electric power quantity with sufficient accuracy even for a route, which the self vehicle has not traveled.

The destination, which is set up, and the departure point in traveling to the destination concerned may be transmitted to the center device. Accordingly, it becomes possible to calculate the necessary electric power quantity for the guide route from the departure point to the destination, which have been specified by the vehicular device. Here, the departure point does not always need to be the current position but may be an arbitrary departure point.

In addition, it is also conceivable to employ a configuration in which the center device searches for the guide route from the departure point to the destination, which has been specified by the vehicular device. Accordingly, it becomes unnecessary to transmit the guide route from the vehicular device to the center device, and hence communication load can be suppressed.

On the other hand, the vehicular device may search for the guide route, and transmit the guide route to the center device. When the communication band has a margin, by transmitting the guide route from the vehicular device to the center device, it becomes possible to provide the necessary electric power quantity to the route intended by a user. If the guide route searched in the center device and the guide route transmitted from the vehicular device both exist, it is only necessary to calculate the necessary electric power quantity using the guide route transmitted from the vehicular device.

As for the second route overlapping with the already-traveled route of the self vehicle in the guide route of the self vehicle, the necessary electric power quantity may be calculated based on the electric power consumption of the self vehicle. That is, if the second route is a route, which the self vehicle has traveled, the necessary electric power quantity is calculated using the electric power consumption when the self vehicle traveled the route. Accordingly, it is possible to calculate the necessary electric power quantity, which is close to the actual numeric value and more accurate.

The necessary electric power quantity may be calculated based on the traveling history data of the other vehicle, which has identical or similar vehicle type information to the self vehicle. The necessary electric power quantity for traveling a third route overlapping with the already-traveled route by the other vehicle having identical or similar vehicle type information to the self vehicle, of the first route not overlapping with the already-traveled route of the self vehicle in the guide route, may be calculated based on the electric power consumption of the other vehicle concerned for the third route concerned. This is because the other vehicle which has identical or similar vehicle type information to the self vehicle is considered to exhibit the electric power consumption close to that of the self vehicle. Accordingly, it is possible to calculate the necessary electric power quantity with sufficient accuracy.

It is conceivable to determine the relative electric power consumption characteristics of a vehicle by using the driving characteristics data of each of vehicles, which have identical or similar vehicle type information with each other, and to calculate the necessary electric power quantity, based on the electric power consumption of the other vehicle, which has electric power consumption characteristics close to the electric power consumption characteristics of the self vehicle, among other vehicles which have identical or similar vehicle type information to the self vehicle concerned. It is also conceivable to calculate the necessary electric power quantity by modifying (correcting) the electric power consumption of the other vehicle, based on the relation of the electric power consumption characteristics of the self vehicle and the other vehicle concerned, which has identical or similar vehicle type information with each other. Even if a vehicle has identical or similar vehicle type information, the electric power consumption increases or decreases depending on driver's driving characteristics. Therefore, it is possible to determine the necessary electric power quantity with still higher accuracy, by calculating the necessary electric power quantity in consideration of the electric power consumption characteristics, which is determined by using the driving characteristics data.

It is conceivable to calculate the necessary electric power quantity based on the other vehicle's traveling history data which satisfies that the scheduled time of day when the self vehicle will travel the guide route according to the schedule information and the traveling time of day indicating the time of day when the other vehicle has traveled the already-traveled route are within a predetermined time difference. This is because it is considered that the situation of congestion of a route differs according to the time zone to travel, and hence the electric power consumption also differs according to the time zone to travel. It is conjectured that for example, the quantity of electric power consumption increases relatively in the morning or in the evening because of much traffic congestion, and that the quantity of electric power consumption decreases relatively at midnight because of fewer traveling vehicles. In this way, it is possible to calculate the necessary electric power quantity with sufficient accuracy, by considering the traveling time of day and using the electric power consumption of the other vehicle at a closer traveling time of day.

As for a fourth route, which cannot use the traveling history data of the other vehicle effectively in the guide route, a necessary electric power quantity may be calculated (predicted) based on the electric power consumption characteristics of the self vehicle and the traveling environment data to the fourth route. The necessary electric power quantity may be calculated (predicted) based on the electric power consumption in a predetermined route of the self vehicle and the traveling environment data about the fourth route. This is because it is considered that the electric power consumption may be different, depending on the environment of the road to travel. For example, in a road with many signals and in an uphill road, it is considered that the electric power quantity to be consumed increases relatively. On the other hand, in a downhill road, recovery of regeneration energy is expected; accordingly, it is considered that the electric power quantity to be consumed becomes relatively small. Therefore, the necessary electric power quantity can be calculated with high accuracy by using the traveling environment data, which indicates the traveling environment for a route. The traveling environment data may include at least one of the position and/or number of signals, the position and/or number of crossings, the position and/or number of stops, road geometry, and the degree of congestion.

It is conceivable to calculate the excess/deficit of electric power quantity of the self vehicle in the center device, based on the calculated necessary electric power quantity of the self vehicle, and the electricity storage quantity transmitted from the self vehicle. It is also conceivable to calculate the excess/deficit of electric power quantity of the self vehicle in the vehicular device, based on the necessary electric power quantity transmitted from the center device, and the detected electricity storage quantity. Accordingly, it is possible to calculate the excessive electric power quantity or the deficit of electric power quantity of the self vehicle.

It is conceivable to search for the other vehicle, which can afford the electric power transmission to the self vehicle, by referring to the excess/deficit of electric power quantity calculated by the center device, and by comparing the guide route of the self vehicle and the guide route of the other vehicle. It is also conceivable to search for the other vehicle, which can afford the electric power transmission to the self vehicle, by referring to the excess/deficit of electric power quantity transmitted from the vehicle, and by comparing the guide route of the self vehicle and the guide route of the other vehicle. In this way, it is possible to contribute to promotion of the electric power transmission/reception between vehicles, by searching for the other vehicle, which can afford the electric power transmission to the self vehicle, which is in electric power deficiency. If the electric power transmission/reception between vehicles is promoted, it becomes possible for the self vehicle to reach the destination, by receiving electric power from the other vehicle in the middle of the guide route, even in a road environment in which the electric charging equipment is not prepared.

Here, it is conceivable to employ a configuration in which the center device searches for multiple other vehicles so that the summation of the excessive electric power quantity of the other vehicles may become equal to or more than the deficit of electric power quantity of the self vehicle. When the deficit of electric power quantity of the self vehicle cannot be covered by a single other vehicle, the deficit of electric power quantity may be covered by multiple other vehicles.

Electric power transmission information may be transmitted from the center device to the vehicular device of the other vehicle, and the vehicular device of the other vehicle may inform a user of the received electric power transmission information. When the user of the other vehicle specifies acceptance of the electric power transmission, electric power receiving information is transmitted from the center device to the self vehicle, and the vehicular device of the self vehicle informs a user of the received electric power receiving information. In this way, the electric power transmission/reception between vehicles is promoted, by inducing the electric power transmission from the other vehicle to the self vehicle, via the center device. The utilization efficiency of electric power energy can be improved by promoting the electric power transmission including the surplus electric power obtained by the recovery of regeneration energy and the like.

It is also conceivable that a household terminal unit including a home-side electric power transmission/reception unit, which can supply electric power to a vehicle is further provided, and that a center-side control unit may calculate the excess/deficit of electric power quantity of the self vehicle based on the guide route, and may search for an electric power supply candidate home, which is a home installed with the household terminal unit and capable of supplying electric power to the self vehicle concerned. In general, homes exist more in number than what is called an electric charging spot or the like, therefore, it is possible to secure the number of places which can implement charging, by including the homes as the search target. Accordingly, even when there exists no other vehicle, which can afford the electric power supply to the self vehicle in electric power deficiency, it is possible to search for a target which can afford the electric power supply to the self vehicle, and hence convenience is improved.

In this case, traveling to the destination may be assisted more reliably by searching for multiple electric power supply candidate homes so that the summation of the quantity of electric power supply from the household terminal unit may become equal to or more than the deficit of electric power quantity of the self vehicle.

It is conceivable to promote electric power supply and to improve the utilization efficiency of the surplus electric power, by transmitting and receiving the information related to the acceptance/rejection of electric power supply between the center device and the household terminal unit. In this case, the utilization efficiency of electric power energy can be improved by searching, as an electric power supply candidate home, a home equipped with a home-side electric power generation unit, which generates electricity in a home, and with a home-side electricity storage unit, which stores surplus electric power out of the generated electric power.

It is conceivable to reduce a possibility that the quantity of electric power supply is short when a vehicle reaches an electric power supply candidate home, by storing the history of the quantity of electric power supply in the past, calculating a predicted value of the surplus electric power at the expected arrival time of day of the vehicle based on the history, and searching for the electric power supply candidate home. In this case, it is possible to predict the available electric power quantity more precisely, by storing the past history of the quantity of electric power supply in association with the environmental information of the electric power supply candidate home concerned, such as a time zone and the weather.

It is conceivable to provide a vehicular device, which includes each unit described on the vehicular device in the information and telecommunications system.

The vehicular device may be equipped with an informing unit and may inform the necessary electric power quantity and/or the excess/deficit of electric power quantity by use of the informing unit. Accordingly, the user can know the necessary electric power quantity to the destination, and the degree of the surplus or short electric power.

The electric power quantity corresponding to the necessary electric power quantity and/or the excess/deficit of electric power quantity may be transmitted to the exterior of the vehicle by an electric power transmission unit. Accordingly, it is possible to transmit the surplus electric power to a road side device or the other vehicle, restricting the self vehicle from falling into electric power deficiency after electric power transmission.

It is conceivable to calculate time required for electric power transmission of the electric power quantity and to inform the electric power transmission time by use of the informing unit. For example, when the electric power transmission time is short, there may be some users who have idea of trying to implement the electric power transmission. Therefore, it is possible to provide useful information to a user by calculating and informing the electric power transmission time.

It is also conceivable to provide the center device which functions as an element of the information and telecommunications system.

The above structures of the embodiments can be combined as appropriate. The above processings such as calculations and determinations are not limited being executed by the control devices 105, 205. The control unit may have various structures including the control devices 105, 205 shown as an example.

The above processings such as calculations and determinations may be implemented by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An information and telecommunications system comprising:
   a vehicular device including
      a vehicle-side communication unit,
      a vehicle-side storage unit configured to
         associate an already-traveled route with a power consumption when a self vehicle has traveled the already-traveled route and
         store the associated already-traveled route and the power consumption, as traveling history data, and
      a vehicle-side control unit configured to transmit the traveling history data; and
   a center device including
      a center-side communication unit configured to implement communications with the vehicle-side communication unit,
      a center-side storage unit configured to store the traveling history data transmitted from a plurality of vehicles each equipped with the vehicular device,
      a center-side first determination unit configured to determine whether a first route, which is not overlapping with the already-traveled route of the self vehicle, is included in a guide route, which is to be traveled by the self vehicle,
      a center-side second determination unit configured to determine, when the center-side first determination unit determines that the first route is included in the guide route, whether traveling history data of an other vehicle including the first route is stored in the center-side storage unit, a center-side search unit configured to search, when the center-side second determination unit determines that the traveling history data of an other vehicle including the first route is stored in the center-side storage unit, the traveling history data including the first route from the traveling history data of the other vehicle, and a center-side control unit configured to calculate, when the center-side second determination unit determines that the traveling history data of the other vehicle including the first route is stored in the center-side storage unit, a necessary electric power quantity for traveling the first route based on the traveling history data of the other vehicle including the first route searched by the center-side search unit, and calculate, when the center-side first determination unit determines that the first route is not included in the guide route, a necessary electric power quantity for traveling based on an electric power consumption of the self vehicle.

2. The information and telecommunications system according to claim 1, wherein the vehicle-side control unit is further configured to transmit, to the center device, a destination, which is being set, and a departure point, when moving to the destination, the center-side storage unit is further configured to store the departure point and the destination received from the self vehicle, and the center-side control unit is further configured to calculate a necessary electric power quantity for traveling the first route in the guide route from the departure point to the destination of the self vehicle stored in the center-side storage unit, based on the traveling history data of an other vehicle stored in the center-side storage unit.

3. The information and telecommunications system according to claim 2, wherein the center device further includes a center-side route searching unit having map information and configured to search for the guide route from the departure point to the destination, the center-side storage unit is further configured to store the guide route searched by the center-side route searching unit, and the center-side control unit is further configured to calculate a necessary electric power quantity for traveling the first route in the guide route for the self vehicle stored in the center-side storage unit, based on the traveling history data of an other vehicle stored in the center-side storage unit.

4. The information and telecommunications system according to claim 2, wherein the vehicular device further includes a vehicle-side route searching unit having map information and configured to search for the guide route from the departure point to the destination, the vehicle-side control unit is further configured to transmit the guide route searched by the vehicle-side route searching unit to the center device, the center-side storage unit is further configured to store the guide route transmitted from the self vehicle, and the center-side control unit is further configured to calculate a necessary electric power quantity for traveling the first route in the guide route for the self vehicle stored in the center-side storage unit, based on the traveling history data of an other vehicle stored in the center-side storage unit.

5. The information and telecommunications system according to claim 1, wherein the center-side control unit is configured to calculate a necessary electric power quantity for traveling a second route, based on power consumption of the self vehicle for the already-traveled route, the second route being included in the guide route for the self vehicle and is overlapping with the already-traveled route of the self vehicle stored in the center-side storage unit.

6. The information and telecommunications system according to claim 5, wherein the center-side control unit is further configured to calculate a necessary electric power quantity for traveling a third route of the first route, based on the power consumption of an other vehicle for the third route, the third route being overlapping with the already-traveled route by an other vehicle, which has identical or similar vehicle type information to the self vehicle.

7. The information and telecommunications system according to claim 5, wherein the center-side route searching unit includes map information having traveling environment data representing the traveling environment of a route, and the center-side control unit is further configured to calculate a necessary electric power quantity for traveling a fourth route of the first route, based on the electric power consumption characteristics of the self vehicle and the traveling environment data of the fourth route, the fourth route being not overlapping with the already-traveled route by an other vehicle, which has identical or similar vehicle type information to the self vehicle.

8. The information and telecommunications system according to claim 7, wherein the traveling environment data includes at least one of a position of a signal, a number of signals, a position of a crossing, a number of crossings, a position of a stop, a number of stops, a road geometry, and a degree of congestion.

9. The information and telecommunications system according to claim 5, wherein the center-side route searching unit includes map information having traveling environment data representing the traveling environment for a route, and the center-side control unit is further configured to calculate a necessary electric power quantity for traveling a fourth route of the first route, based on the electric power consumption in a predetermined route of the self vehicle and the traveling environment data of the fourth route, the fourth route being not overlapping with the route traveled by an other vehicle, which has identical or similar vehicle type information to the self vehicle.

10. The information and telecommunications system according to claim 1, wherein the vehicle-side control unit is further configured to transmit vehicle type information, which represents a classification of the self vehicle, to the center device, the center-side storage unit is further configured to store the vehicle type information transmitted from a plurality of vehicles each equipped with the vehicular device, and the center-side control unit is further configured to calculate the necessary electric power quantity, based on traveling history data of an other vehicle, which has identical or similar vehicle type information to the self vehicle.

11. The information and telecommunications system according to claim 10, wherein the vehicular device further includes a driving characteristics data detection unit configured to detect data related to driver's driving characteristics, the vehicle-side control unit is further configured to transmit the driving characteristics data to the center device, the center-side storage unit is further configured to store the driving characteristics data transmitted from a plurality of vehicles each equipped with the vehicular device, and the center-side control unit is further configured to determine relative electric power consumption characteristics based on driving characteristics data of a vehicle, which has identical or similar vehicle type information, among the driving characteristics data stored in the center-side storage unit and calculate the necessary electric power quantity, based on the power consumption of an other vehicle, which has electric power consumption characteristics close to the electric power consumption characteristics of the self vehicle, among other vehicles, which have identical or similar vehicle type information to the self vehicle.

12. The information and telecommunications system according to claim 10, wherein the vehicular device further includes a driving characteristics data detection unit configured to detect data related to driver's driving characteristics, the vehicle-side control unit is further configured to transmit the driving characteristics data to the center device, the center-side storage unit is further configured to store the driving characteristics data transmitted from a plurality of vehicles each equipped with the vehicular device, and the center-side control unit is further configured to determine relative electric power consumption characteristics based on driving characteristics data of a vehicle, which has identical or similar vehicle type information, among the driving characteristics data stored in the center-side storage unit and correct the power consumption of an other vehicle and calculate the necessary electric power quantity, based on the relation of the electric power consumption characteristics of the self vehicle and an other vehicle, which have identical or similar vehicle type information with each other.

13. The information and telecommunications system according to claim 1, wherein the vehicle-side storage unit is further configured to associate the already-traveled route of the self vehicle with a traveling time of day when the self vehicle has traveled the route and store the associated already-traveled route and the traveling time of day, as the traveling history data, the vehicle-side control unit is further configured to transmit, to the center device, the traveling history data, which includes the traveling time of day, and schedule information representing a time of day at an arbitrary point from the departure point to the destination, the center-side storage unit is further configured to store the traveling history data, which are transmitted from a plurality of vehicles each equipped with the vehicular device, and the schedule information, which are transmitted from the self vehicle, and the center-side control unit is further configured to calculate the necessary electric power quantity, based on the traveling history data, which satisfies that the traveling time of day of an other vehicle and the schedule information of the self vehicle are in a predetermined time difference, among the traveling history data of an other vehicles stored in the center-side storage unit.

14. The information and telecommunications system according to claim 1, wherein the vehicular device further includes an electricity storage quantity detection unit configured to detect an electricity storage quantity of the self vehicle, the vehicle-side control unit is further configured to transmit the electricity storage quantity detected by the electricity storage quantity detection unit to the center device, the center-side storage unit is further configured to store the electricity storage quantity transmitted from the self vehicle, and the center-side control unit is further configured to calculate an excess/deficit of electric power quantity of the self vehicle, based on the necessary electric power quantity of the self vehicle and the electricity storage quantity of the self vehicle stored in the center-side storage unit.

15. The information and telecommunications system according to claim 14, wherein the center-side storage unit is further configured to store the excess/deficit of electric power quantity of a vehicle calculated by the center-side control unit based on the guide route, and the center-side control unit is further configured to, when the excess/deficit of electric power quantity of the self vehicle stored in the center-side storage unit is a deficit, search for an other vehicle, of which the excess/deficit of electric power quantity stored in the center-side storage unit is an excessive, and of which a guide route overlaps with the guide route of the self vehicle or exists within a prescribed distance enabling electric power transmission/reception.

16. The information and telecommunications system according to claim 15, wherein the center-side control unit is further configured to search for a plurality of other vehicles so as to make a summation of the excessive electric power quantity of an other vehicles equal to or more than the deficit of electric power quantity of the self vehicle.

17. The information and telecommunications system according to claim 15, wherein the vehicular device further includes an informing unit and an input unit, the center-side control unit is further configured to transmit, to the other vehicle being searched for, electric power transmission information related to the electric power transmission from the other vehicle to the self vehicle, the vehicle-side control unit of the other vehicle is configured to inform a user of the vehicular device, by using the informing unit, of the electric power transmission information transmitted from the center device and transmit, to the center device, information about acceptance/rejection of the electric power transmission, which the user has inputted by using the input unit, the center-side control unit is further configured to, when the information about acceptance/rejection of the electric power transmission transmitted from the other vehicle is acceptance, transmit, to the self vehicle, power receiving information related to power receiving from the other vehicle to the self vehicle, and the vehicle-side control unit of the self vehicle is further configured to inform a user, by using the informing unit, of the power receiving information transmitted from the center device.

18. The information and telecommunications system according to claim 14, further comprising:
a household terminal unit including
a home-side communication unit located in a home and configured to communicate with the center device, and
a home-side power transmission/reception unit located in the home and configured to supply electric power to a vehicle, wherein
the center-side storage unit is further configured to store a quantity of electric power supply in the household terminal unit transmitted by the home-side communication unit,
the center-side control unit is further configured to calculate the excess/deficit of electric power quantity of the self vehicle, based on the guide route, and
the center-side control unit is further configured to,
when the excess/deficit of electric power quantity of the self vehicle is a deficit,
search for an electric supply candidate home installed with the household terminal unit, of which the quantity of electric power supply stored in the center-side storage unit indicates capability of electric power supply to the self vehicle, and which is overlapping with the guide route of the self vehicle, or within the prescribed distance enabling the electric power transmission/reception.

19. The information and telecommunications system according to claim 18, wherein the center-side control unit is further configured to search for a plurality of the electric supply candidate homes each being installed with the household terminal unit so as to make a summation of the quantity of electric power supply from the household terminal unit equal to or more than the deficit of electric power quantity of the self vehicle.

20. The information and telecommunications system according to claim 18, wherein
the vehicular device further includes an informing unit,
the center-side control unit is further configured to transmit information, which is related to the electric power supply to the self vehicle, to the household terminal unit installed in the electric supply candidate home,
the household terminal unit is further configured to
inform the information, which is related to the electric power supply transmitted from the center device, to a resident of the home, in which the household terminal unit is installed and
transmit, to the center device, information about the acceptance/rejection of electric power supply from the resident,
the center-side control unit is further configured to,
when the information about acceptance/rejection of electric power supply transmitted from the household terminal unit is acceptance,
transmit, to the self vehicle, information related to the electric supply candidate home, and
the vehicle-side control unit of the self vehicle is further configured to inform a user, by using the informing unit, of the information related to the electric supply candidate home transmitted from the center device.

21. The information and telecommunications system according to claim 18, wherein
the household terminal unit further includes
a home-side power generation unit configured to generate electricity in the home, and
a home-side power storage unit configured to store the electric power generated by the home-side power generation unit,
the household terminal unit is further configured to transmit, to the center device, surplus electric power stored in the home-side power storage unit, as the quantity of electric power supply, and
the center-side control unit is further configured to search for the home equipped with the home-side power generation unit and the home-side power storage unit, as the electric supply candidate home.

22. The information and telecommunications system according to claim 18, wherein
the center-side storage unit is further configured to store a history of the quantity of electric power supply in the past in the household terminal unit, transmitted from the home-side communication unit, and
the center-side control unit is further configured to
calculate a predicted value of a surplus electric power at an expected arrival time of day when the vehicle, of which the excess/deficit of electric power quantity is a deficit, is expected to reach an electric supply candidate home, based on the history of the quantity of electric power supply in the past stored in the center-side storage unit and
search for the electric supply candidate home, based on the predicted value.

23. The information and telecommunications system according to claim 22, wherein
the center-side storage unit is further configured to
associate the history of the quantity of electric power supply in the past with the environmental information related to the environment of a home installed with the household terminal unit and
store the associated history of the quantity and the environmental information, and
the center-side control unit is further configured to search for the electric supply candidate home, based on the history of the quantity of electric power supply in the past and the environmental information.

24. The information and telecommunications system according to claim 1, wherein
the vehicular device further includes an electricity storage quantity detection unit configured to detect an electricity storage quantity of the self vehicle, and
the vehicle-side control unit is further configured to calculate an excess/deficit of electric power quantity of the self vehicle, based on the necessary electric power quantity transmitted from the center device, and the electricity storage quantity detected by the electricity storage quantity detection unit.

25. The information and telecommunications system according to claim 24, wherein
the vehicle-side control unit is further configured to transmit the excess/deficit of electric power quantity to the center device,
the center-side storage unit is further configured to store the excess/deficit of electric power quantity transmitted from a plurality of vehicles each equipped with the vehicular device, and
the center-side control unit is further configured to,
when the excess/deficit of electric power quantity of the self vehicle stored in the center-side storage unit is a deficit,
search for an other vehicle, of which the excess/deficit of electric power quantity stored in the center-side storage unit is an excessive, and of which a guide route overlaps with the guide route of the self vehicle or exists within a prescribed distance enabling electric power transmission/reception.

26. A center device comprising:
a center-side receiving unit configured to receive, from a plurality of vehicles, traveling history data including an already-traveled route, which is traveled by a vehicle, associated with power consumption when the vehicle has traveled the already-traveled route;
a center-side storage unit configured to store the traveling history data received by using the center-side receiving unit;
a center-side first determination unit configured to determine whether a first route, which is not overlapping with the already-traveled route of a predetermined vehicle, is included in a guide route, which is to be traveled by the predetermined vehicle,
a center-side second determination unit configured to determine, when the center-side first determination unit determines that the first route is included in the guide route, whether traveling history data of an other vehicle including the first route is stored in the center-side storage unit,
a center-side search unit configured to search, when the center-side second determination unit determines that the traveling history data of an other vehicle including the first route is stored in the center-side storage unit, the traveling history data including the first route from the traveling history data of the other vehicle, and
a center-side control unit configured to
  calculate, when the center-side second determination unit determines that the traveling history data of the other vehicle including the first route is stored in the center-side storage unit, a necessary electric power quantity for traveling the first route based on the traveling history data of the other vehicle including the first route searched by the center-side search unit, and
  calculate, when the center-side first determination unit determines that the first route is not included in the guide route, a necessary electric power quantity for traveling based on an electric power consumption of the predetermined vehicle.

27. A method for controlling an information and telecommunications system including a vehicular device and a center device respectively equipped with communication units for communicating with each other, the method comprising:
causing a vehicle-side storage unit of the vehicular device to associate an already-traveled route with a power consumption when a self vehicle has traveled the already-traveled route and to store the associated already-traveled route and the power consumption, as traveling history data;
causing a vehicle-side control unit of the vehicular device to transmit the traveling history data;
causing a center-side storage unit of the center device to store the traveling history data transmitted from a plurality of vehicles each equipped with the vehicular device; and
causing a center-side control unit of the center device to:
  determine whether a first route, which is not overlapping with the already-traveled route of the self vehicle, is included in a guide route, which is to be traveled by the self vehicle,
  determine, on determination that the first route is included in the guide route, whether traveling history data of an other vehicle including the first route is stored in the center-side storage unit;
  search, on determination that the traveling history data of an other vehicle including the first route is stored in the center-side storage unit, the traveling history data including the first route from the traveling history data of an other vehicle;
  calculate, on determination that the traveling history data of an other vehicle including the first route is stored in the center-side storage unit, a necessary electric power quantity for traveling the first route based on the traveling history data of an other vehicle including the first route searched by the center-side search unit; and
  calculate, on determination that the first route is not included in the guide route, a necessary electric power quantity for traveling based on an electric power consumption of the self vehicle.

28. A non-transitory computer readable medium comprising instructions executed by a computer, the instructions including the method for controlling an information and telecommunications system including a vehicular device and a center device respectively equipped with communication units for communicating with each other, the instructions for:
causing a vehicle-side storage unit of the vehicular device to associate an already-traveled route with a power consumption when a self vehicle has traveled the already-traveled route and to store the associated already-traveled route and the power consumption, as traveling history data;
causing a vehicle-side control unit of the vehicular device to transmit the traveling history data;
causing a center-side storage unit of the center device to store the traveling history data transmitted from a plurality of vehicles each equipped with the vehicular device; and
causing a center-side control unit of the center device to:
  determine whether a first route, which is not overlapping with the already-traveled route of the self vehicle, is included in a guide route, which is to be traveled by the self vehicle,
  determine, on determination that the first route is included in the guide route, whether traveling history data of an other vehicle including the first route is stored in the center-side storage unit;
  search, on determination that the traveling history data of an other vehicle including the first route is stored in the center-side storage unit, the traveling history data including the first route from the traveling history data of an other vehicle;
  calculate, on determination that the traveling history data of an other vehicle including the first route is stored in the center-side storage unit, a necessary electric power quantity for traveling the first route based on the traveling history data of an other vehicle including the first route searched by the center-side search unit; and
calculate, on determination that the first route is not included in the guide route, a necessary electric power quantity for traveling based on an electric power consumption of the self vehicle.

* * * * *